US010136101B2

(12) United States Patent
Akao et al.

(10) Patent No.: US 10,136,101 B2
(45) Date of Patent: Nov. 20, 2018

(54) INFORMATION PROCESSING APPARATUS, COMMUNICATION SYSTEM, AND INFORMATION PROCESSING METHOD

(71) Applicant: SONY CORPORATION, Tokyo (JP)

(72) Inventors: Masato Akao, Kanagawa (JP); Ryohei Okada, Chiba (JP); Junichi Tanaka, Kanagawa (JP); Kazuhiko Nishibori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/560,202

(22) PCT Filed: Feb. 8, 2016

(86) PCT No.: PCT/JP2016/053697
§ 371 (c)(1),
(2) Date: Sep. 21, 2017

(87) PCT Pub. No.: WO2016/158014
PCT Pub. Date: Oct. 6, 2016

(65) Prior Publication Data
US 2018/0077383 A1 Mar. 15, 2018

(30) Foreign Application Priority Data
Mar. 31, 2015 (JP) ................................. 2015-073746

(51) Int. Cl.
*H04N 7/14* (2006.01)
*G06K 9/00* (2006.01)
(Continued)

(52) U.S. Cl.
CPC ......... *H04N 7/147* (2013.01); *G06K 9/00228* (2013.01); *G06K 9/00597* (2013.01);
(Continued)

(58) Field of Classification Search
CPC ....................................................... H04N 7/14
See application file for complete search history.

(56) References Cited

U.S. PATENT DOCUMENTS

| 9,325,939 B2 * | 4/2016 | Schultz ................. H04N 7/144 |
| 2003/0197779 A1 | 10/2003 | Zhang et al. |
| 2014/0184724 A1 * | 7/2014 | Cho ....................... H04N 7/144 |
| | | 348/14.07 |

FOREIGN PATENT DOCUMENTS

| JP | 07-30877 A | 1/1995 |
| JP | 07-030877 A | 1/1995 |
| JP | 2003-009108 A | 1/2003 |

OTHER PUBLICATIONS

Ott, et al., "Teleconferencing Eye Contact Using a Virtual Camera", 02 pages.

(Continued)

*Primary Examiner* — Olisa Anwah
(74) *Attorney, Agent, or Firm* — Chip Law Group

(57) ABSTRACT

An information processing apparatus according to the present disclosure includes: a receiver unit that acquires information relevant to a sight line of a user of a communication partner from a communication partner terminal that performs remote communication; a face detection unit that detects information relevant to a position and a size of a face of the user of the communication partner, on the basis of a video signal that includes the face of the user of the communication partner; and a superimposition unit that displays and superimposes a sight line position of the user of the communication partner on the video signal including the face of the user of the communication partner, based on the information relevant to the sight line of the user of the communication partner and the information relevant to the position and the size of the face of the user of the communication partner.

18 Claims, 36 Drawing Sheets

(51) Int. Cl.
*G06T 11/60* (2006.01)
*G06T 7/60* (2017.01)
*G06T 7/33* (2017.01)
*G06T 7/73* (2017.01)

(52) U.S. Cl.
CPC ............... *G06T 7/337* (2017.01); *G06T 7/60* (2013.01); *G06T 7/74* (2017.01); *G06T 11/60* (2013.01); *G06T 2207/10016* (2013.01); *G06T 2207/30201* (2013.01)

(56) References Cited

OTHER PUBLICATIONS

Jerald, et al., "Eye Gaze Correction for Videoconferencing", pp. 77-81.
International Search Report and Written Opinion of PCT Application No. PCT/JP2016/053697, dated Mar. 8, 2016, 07 pages of ISRWO.
Ott, et al., "Teleconferencing eye contact using a virtual camera", CiteSeerX, 1993, 2 pages.
Jerald, et al., "Eye gaze correction for videoconferencing", ETRA '02 Proceedings of the 2002 symposium on Eye tracking research & applications, 2002, pp. 77-81.

* cited by examiner

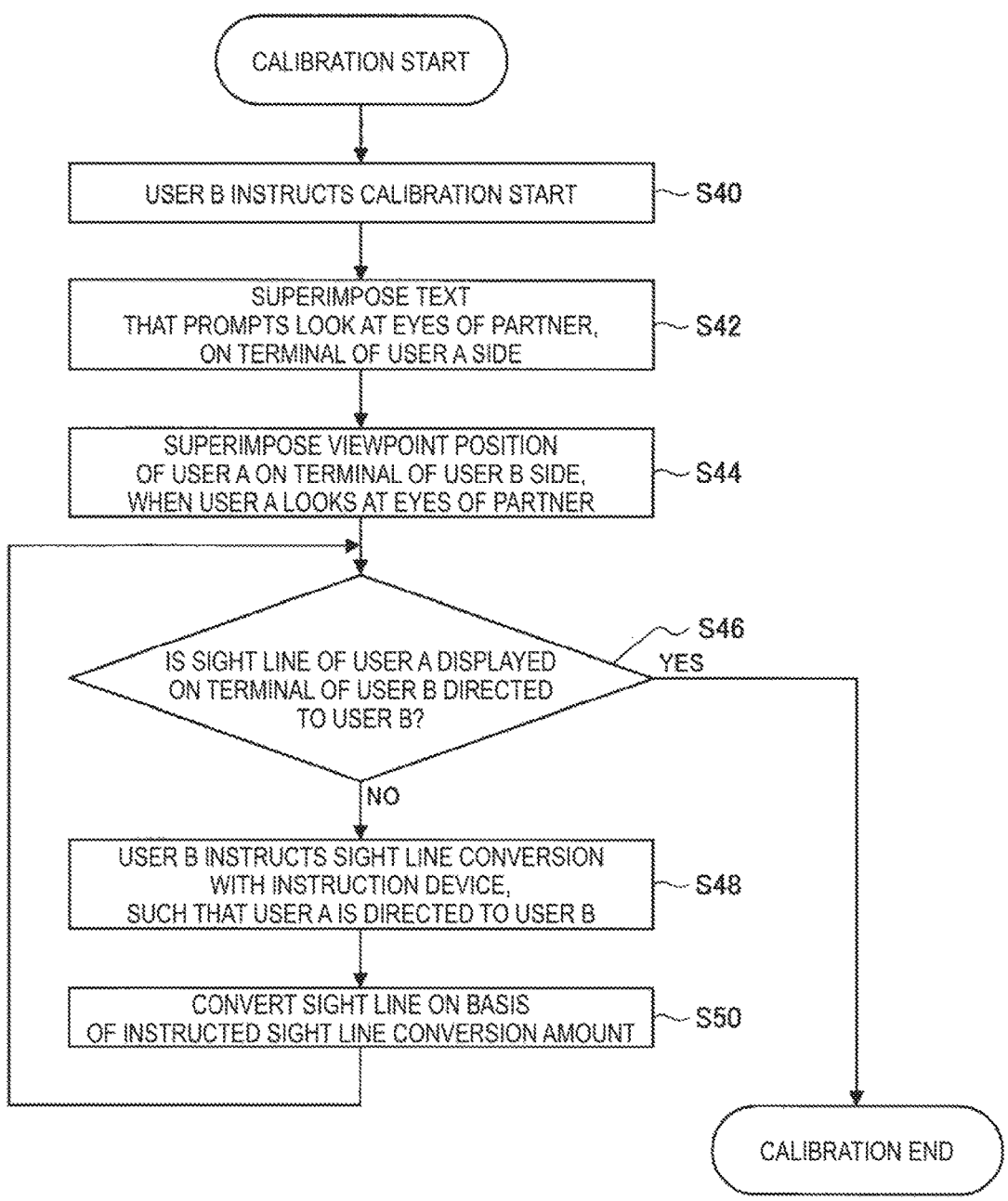

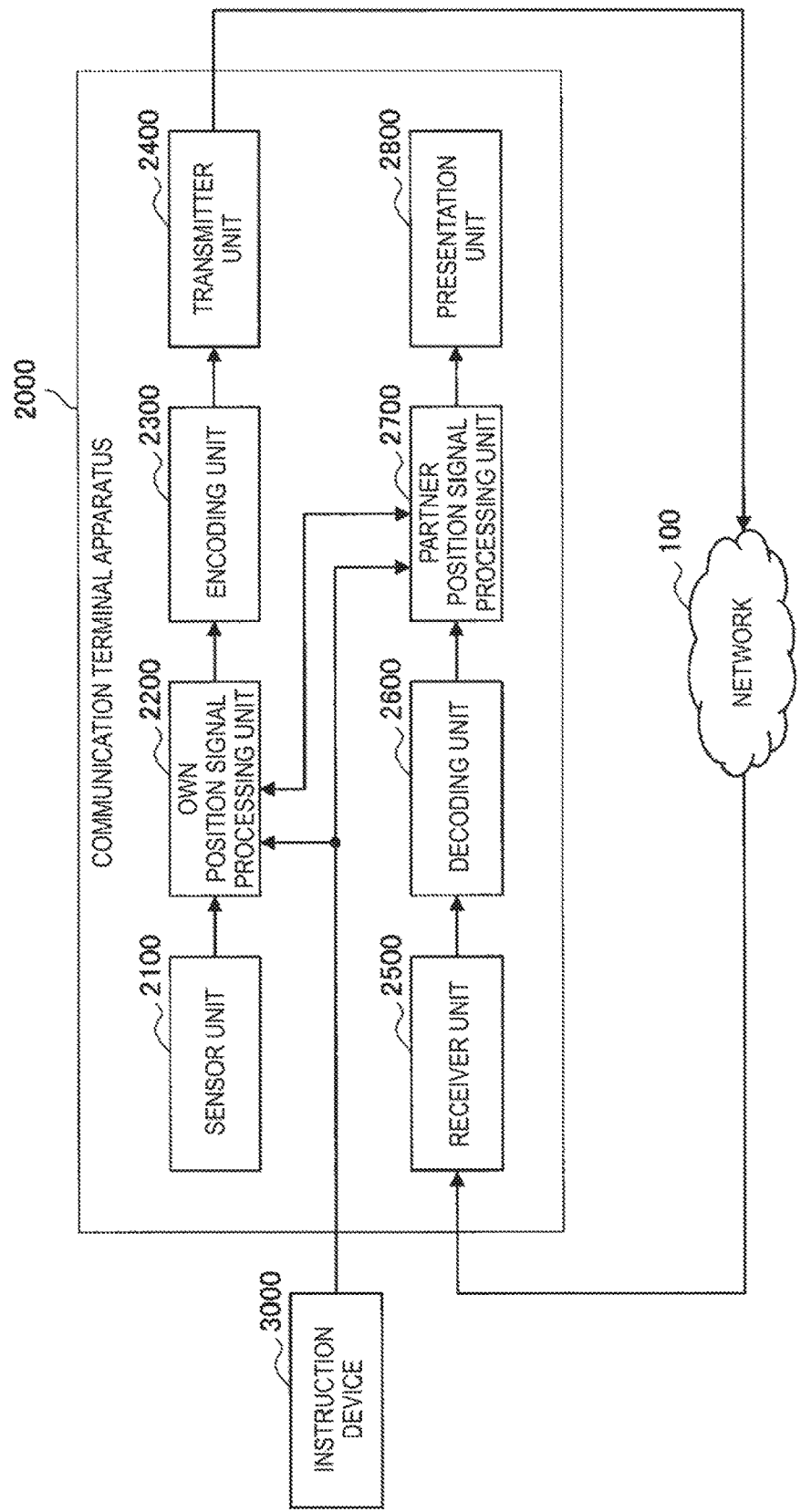

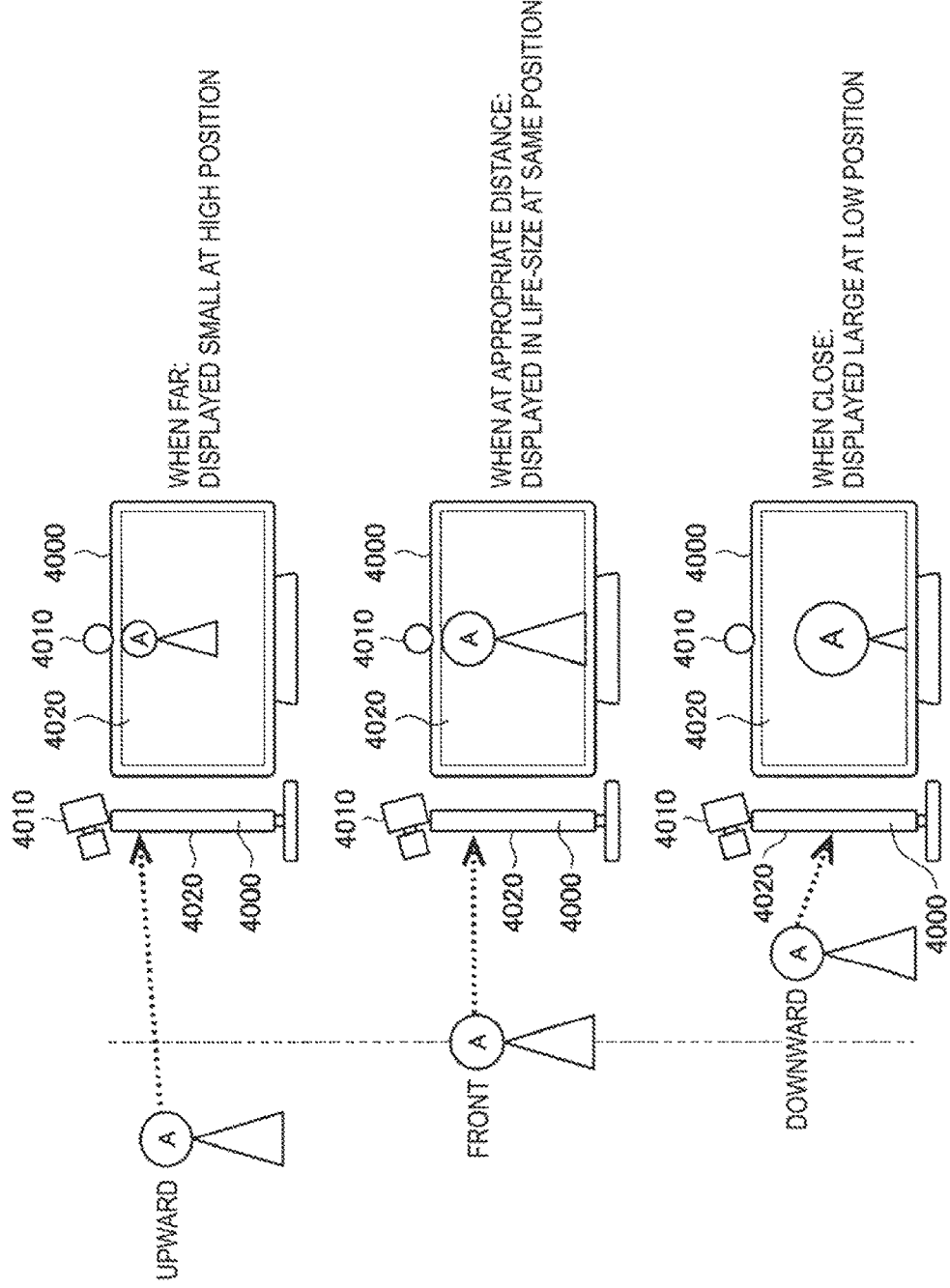

STATE TRANSITION OF CALIBRATION PROCESS

INFORMATION PROCESSING APPARATUS, COMMUNICATION SYSTEM, AND INFORMATION PROCESSING METHOD

CROSS REFERENCE TO RELATED APPLICATIONS

This application is a U.S. National Phase of International Patent Application No. PCT/JP2016/053697 filed on Feb. 8, 2016, which claims priority benefit of Japanese Patent Application No. JP 2015-073746 filed in the Japan Patent Office on Mar. 31, 2015. Each of the above-referenced applications is hereby incorporated herein by reference in its entirety.

TECHNICAL FIELD

The present disclosure relates to an information processing apparatus, a communication system, an information processing method, and a program.

BACKGROUND ART

In recent times, a technology that equips information processing terminals with cameras and performs remote communication to display video of speakers on the terminals of both sides is used. In this situation, below Non-Patent Literature 1 describes generating an intermediate viewpoint from videos of a plurality of viewpoints by interpolation. Also, below Non-Patent Literature 2 describes changing a sight line direction of an eyeball in video.

CITATION LIST

Non-Patent Literature

Non-Patent Literature 1: Ott, M., Lewis, J. P., & Cox, I. (1993). Teleconferencing eye contact using a virtual camera. Paper presented at INTERACT '93 and CHI '93 conference companion on Human factors in computing systems in Amsterdam, The Netherlands, 109-110

Non-Patent Literature 2: Jerald, J., & Daily, M. (2002). Eye gaze correction for videoconferencing. Proceedings of the 2002 symposium on Eye tracking research & applications. New Orleans, La., USA, 77-81.

DISCLOSURE OF INVENTION

Technical Problem

When the remote communication is performed to display the video of the speakers on the terminals of both sides, the aligned sight lines of the speakers of both sides facilitate smooth communication. However, the technology described in the above past technology is a technology that assumes changing the directions of the eyes, and it is difficult to align the sight lines with each other completely by quantitatively changing the directions of the sight lines, when the videos of the speakers are displayed on the terminals of both sides.

Thus, when the videos of the speakers are displayed, it is desired to align the sight lines with each other, by checking the directions of the sight lines with a simple configuration.

Solution to Problem

According to the present disclosure, there is provided an information processing apparatus including: a receiver unit that acquires information relevant to a sight line of a user of a communication partner from a communication partner terminal that performs remote communication; a face detection unit that detects information relevant to a position and a size of a face of the user of the communication partner, on the basis of a video signal that includes the face of the user of the communication partner and is received from the communication partner terminal; and a superimposition unit that displays and superimposes a sight line position of the user of the communication partner on the video signal that includes the face of the user of the communication partner, on the basis of the information relevant to the sight line of the user of the communication partner and the information relevant to the position and the size of the face of the user of the communication partner.

In addition, according to the present disclosure, there is provided an information processing apparatus including: a video signal acquisition unit that acquires a video signal that includes a face of a user of the information processing apparatus; a sight line detection unit that acquires information relevant to a sight line position of the user of the information processing apparatus from the video signal that includes the face of the user of the information processing apparatus; a face detection unit that detects information relevant to a position and a size of the face of the user of the information processing apparatus, on the basis of the video signal that includes the face of the user of the information processing apparatus; and a superimposition unit that displays and superimposes the sight line position of the user of the information processing apparatus on the video signal that includes the face of the user of the information processing apparatus, on the basis of the information relevant to the sight line position of the user of the information processing apparatus and the information relevant to the position and the size of the face of the user of the information processing apparatus.

In addition, according to the present disclosure, there is provided a communication system including: a first communication apparatus including a receiver unit that acquires information relevant to a sight line position of a user of a second communication apparatus from the second communication apparatus that performs remote communication, a face detection unit that detects information relevant to a position and a size of a face of the user of the second communication apparatus, on the basis of a video signal that includes the face of the user of the second communication apparatus and is received from the second communication apparatus, and a superimposition unit that displays and superimposes the sight line position of the user of the second communication apparatus on the video signal that includes the face of the user of the second communication apparatus, on the basis of the information relevant to the sight line position of the user of the second communication apparatus and the information relevant to the position and the size of the face of the user of the second communication apparatus; and the second communication apparatus including a receiver unit that acquires information relevant to a sight line position of a user of the first communication apparatus from the first communication apparatus that performs remote communication, a face detection unit that detects information relevant to a position and a size of a face of the user of the first communication apparatus, on the basis of a video signal that includes the face of the user of the first communication apparatus and is received from the first communication apparatus, and a superimposition unit that displays and superimposes the sight line position of the user of the first communication apparatus on the video signal that includes the face of the user of the first communication apparatus, on the basis of the information relevant to the sight line position of the user of the first communication apparatus and the information relevant to the position and the size of the face of the user of the first communication apparatus.

In addition, according to the present disclosure, there is provided an information processing method including: acquiring information relevant to a sight line of a user of a communication partner from a communication partner terminal that performs remote communication; detecting information relevant to a position and a size of a face of the user of the communication partner, on the basis of a video signal that includes the face of the user of the communication partner and is received from the communication partner terminal; and displaying and superimposing a sight line position of the user of the communication partner on the video signal that includes the face of the user of the communication partner, on the basis of the information relevant to the sight line of the user of the communication partner and the information relevant to the position and the size of the face of the user of the communication partner.

In addition, according to the present disclosure, there is provided a program for causing a computer to function as: a means for acquiring information relevant to a sight line of a user of a communication partner from a communication partner terminal that performs remote communication; a means for detecting information relevant to a position and a size of a face of the user of the communication partner, on the basis of a video signal that includes the face of the user of the communication partner and is received from the communication partner terminal; and a means for displaying and superimposing a sight line position of the user of the communication partner on the video signal that includes the face of the user of the communication partner, on the basis of the information relevant to the sight line of the user of the communication partner and the information relevant to the position and the size of the face of the user of the communication partner.

Advantageous Effects of Invention

As described above, according to the present disclosure, when the videos of the speakers are displayed, the sight lines are aligned with each other, by checking the directions of the sight lines with a simple configuration.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a flowchart illustrating a process of the third embodiment.

FIG. 18 is a schematic diagram illustrating a configuration of a terminal according to the third embodiment.

FIG. 27 is a schematic diagram illustrating calibration in a fourth embodiment.

MODE(S) FOR CARRYING OUT THE INVENTION

Figure 1:
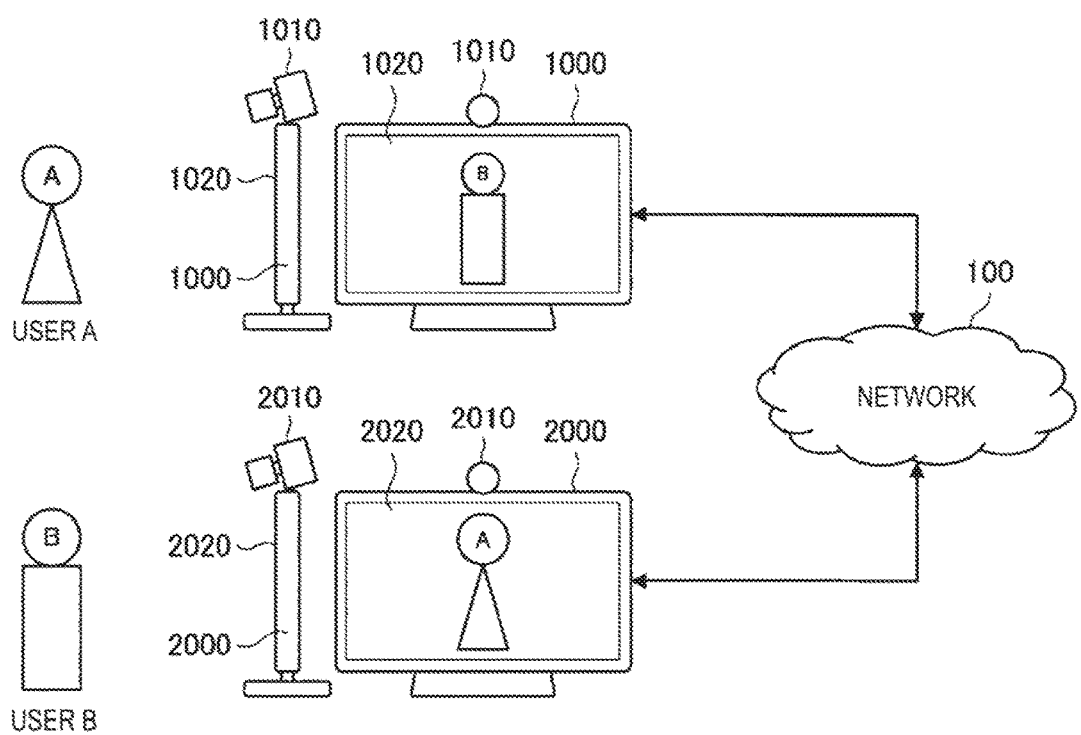
FIG. 1 is a schematic diagram illustrating an overview of a system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. First Embodiment
1.1. Overview of System
1.2. Exemplary Configuration of Terminal
1.3. Exemplary Configuration of System
1.4. Major Components of Terminal
2. Second Embodiment
2.1. Overview of System
2.2. Major Components of Terminal
3. Third Embodiment
3.1. Overview of System
3.2. Major Components of Terminal
4. Fourth Embodiment
4.1. Overview of System
4.2. Exemplary Configuration of Terminal
5. Fifth Embodiment
5.1. Overview of System
5.2. Major Components of Terminal
6. Sixth Embodiment
6.1. Overview of System
6.2. Major Components of Terminal

1. First Embodiment

[1.1. Overview of System]

First, with reference to FIG. 1, an overview of a system according to a first embodiment of the present disclosure will be described. As illustrated in FIG. 1, the system of the first embodiment includes a terminal 1000 of a user A and a terminal 2000 of a user B, so that the user A and the user B perform remote communication by using the terminal 1000 and the terminal 2000. Note that FIG. 1 illustrates a front view and a right side view of each of the terminals 1000 and 2000.

A camera 1010 is provided in the terminal 1000, and captures an image of the user A. A camera 2010 is provided in the terminal 2000, and captures an image of the user B. Note that one camera 1010, 2010 is provided in each of the terminals 1000 and 2000 in FIG. 1, but the camera 1010 is not limited to one. When sight line detection and sight line conversion is performed, each of the terminals 1000 and 2000 can use two or more cameras 1010, 2010. The terminal 1000 and the terminal 2000 are connected via a network 100 such as the Internet, and the image of the user A captured by the camera 1010 is displayed on a screen 2020 of the terminal 2000, and the image of the user B captured by the camera 2010 is displayed on a screen 1020 of the terminal 1000. Also, the terminal 1000 includes a microphone that acquires voice of the user A, and the voice of the user A is transmitted to the terminal 2000 via the network 100 and is pronounced. Also, the terminal 2000 includes a microphone that acquires voice of the user B, and the voice of the user B is transmitted to the terminal 1000 via the network 100 and is pronounced. Thereby, the user A and the user B can perform communication while looking at the partner on the screen of each of the terminals 1000 and 2000.

Figure 2:
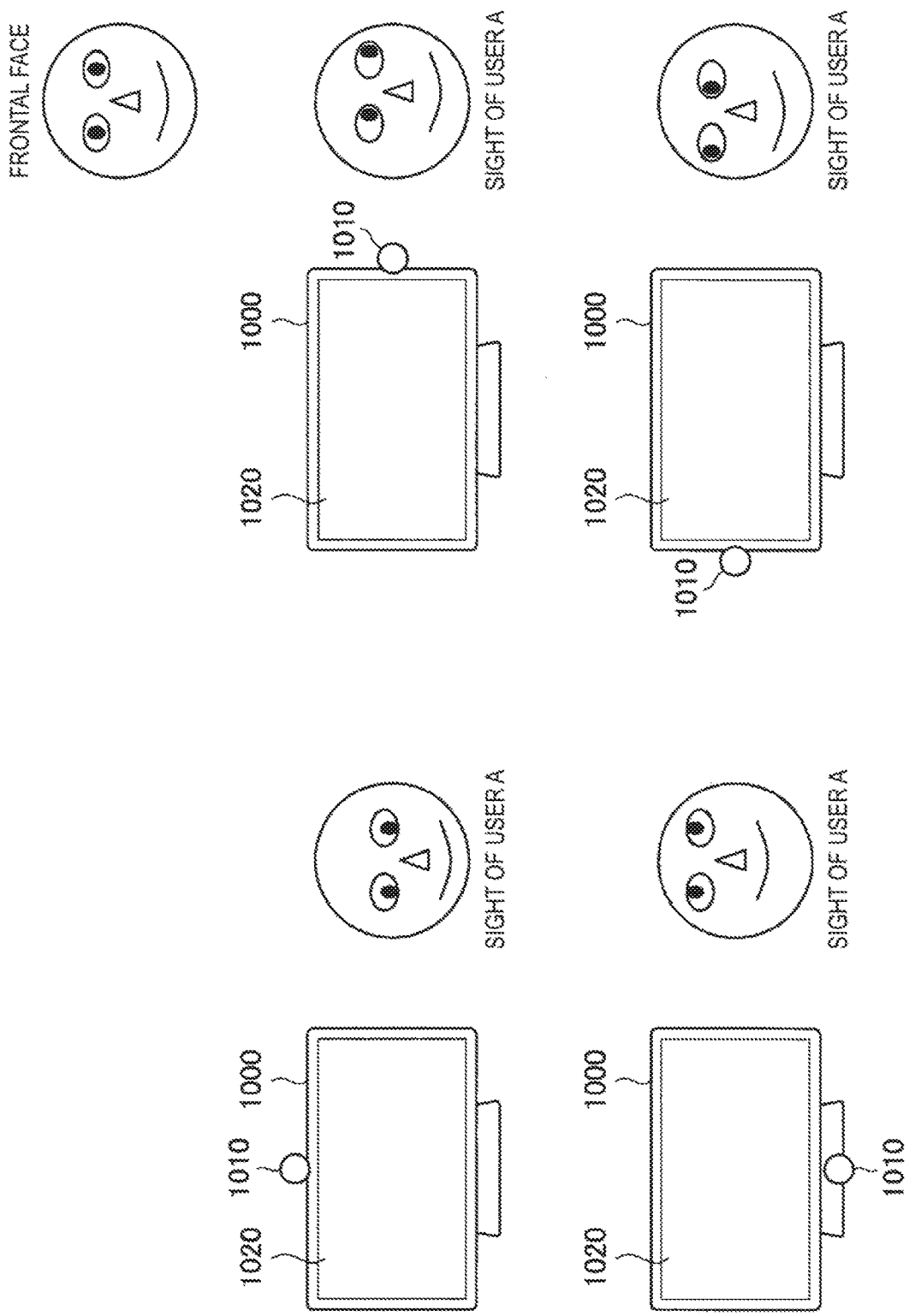
FIG. 2 is a schematic diagram illustrating a situation in which a sight line of a user A differs depending on the position of a camera.

FIG. 2 is a schematic diagram illustrating a situation in which the sight line of the user A differs, depending on the position of the camera 1010. The user A has a conversation, while looking at the user B displayed on the screen 1020. On the other hand, the camera 1010 is located at the top, bottom, left, or right of the screen 1020. When the camera is positioned at the top, bottom, left, or right in relation to the front of the screen 1020, the direction of the captured face changes. For example, when the camera 1010 is at the top of the screen 1020, the sight line of the user A is displayed on the screen 2020 so as to be directed downward, for the communication partner (the user B). In the same way, when the camera 1010 is at the bottom of the screen 1020, the sight line of the user A is displayed on the screen 2020 so as to be directed upward. Also, when the camera 1010 is at the right of the screen 1020, the sight line of the user A is displayed on the screen 2020 so as to be directed to the left, and when the camera 1010 is at the left of the screen 1020, the sight line of the user A is displayed on the screen 2020 so as to be directed to the right.

When the remote communication is performed, the eye contact between the users A, B of both sides in the same way as the reality facilitate smooth communication. When the position of the camera 1010 results in the direction of the sight line that is not directed to the front as illustrated in FIG. 2, a feeling of strangeness arises in the communication.

Figure 3:
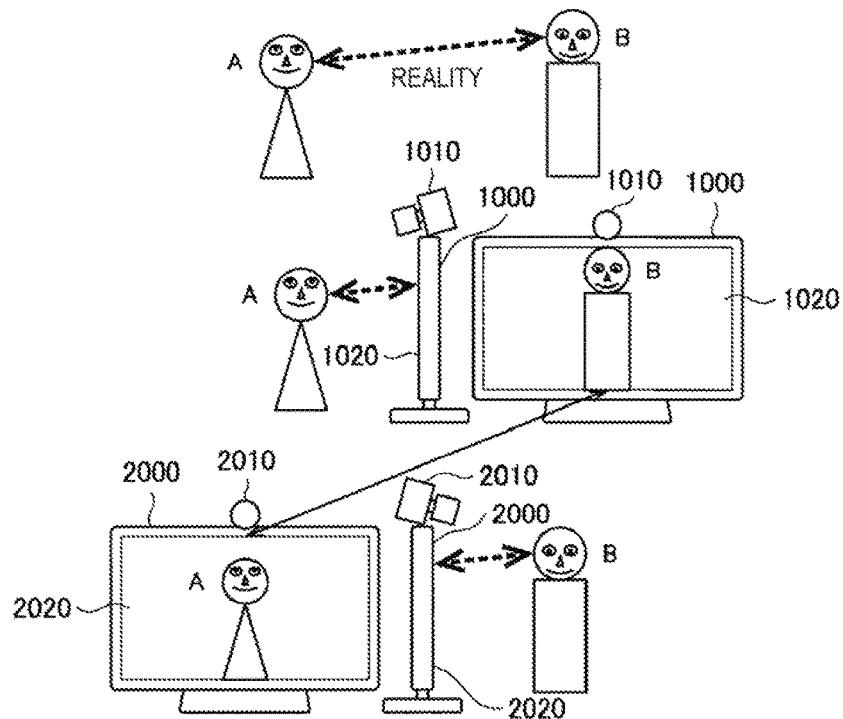
FIG. 3 is a schematic diagram illustrating a case in which heights of a user A and a user B are different.
Figure 4:
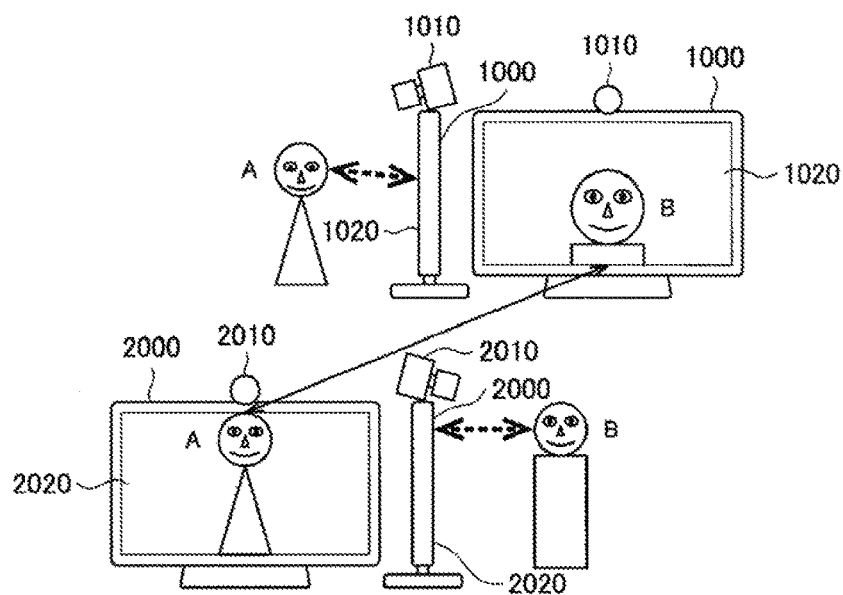
FIG. 4 is a schematic diagram illustrating a state in which eye contact is reproduced by aligning sight lines of a user A and a user B with each other.

FIG. 3 is a schematic diagram illustrating a case in which the heights of the user A and the user B are different. In order to reproduce real eye contact in consideration of the difference between the heights of the user A and the user B, the strict positional relationship between the user A and the user B must be detected to display the user A, the user B at strict positions, sizes, and angles. For example, in FIG. 3, the face of the user B is displayed at the top of the screen 1020, and the face of the user A is displayed downwardly in the screen 2020, on the basis of the height difference between the user A and the user B. In this case as well, if the eye contact is reproduced by aligning the sight lines of the user A and the user B as illustrated in FIG. 4, the smooth communication is achieved.

Hence, in the present embodiment, a marker indicating where the sight line of the partner is directed is displayed on the screens 1020, 2020 and is superimposed on the image of the partner, as a premise for achieving the eye contact. In the following, detail will be described.

[1.2. Exemplary Configuration of Terminal]

Figure 5:
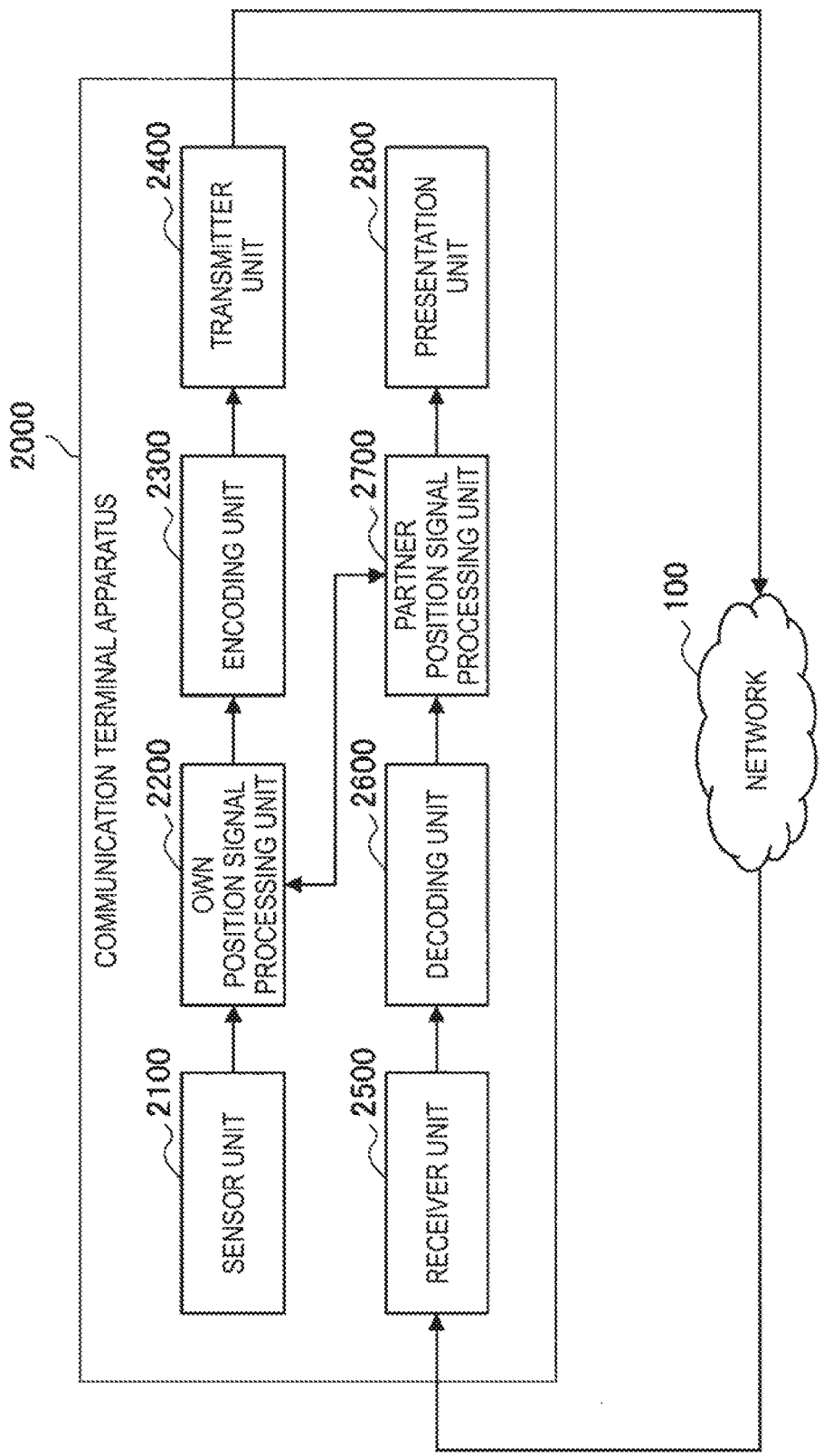
FIG. 5 is a schematic diagram illustrating a configuration of a terminal of a user B.

FIG. 5 is a schematic diagram illustrating a configuration of the terminal 2000. Note that the configuration of the terminal 1000 is the same as the terminal 2000. As illustrated in FIG. 5, the terminal 2000 includes a sensor unit 2100, an own position signal processing unit 2200, an encoding unit 2300, a transmitter unit 2400, a receiver unit 2500, a complex unit 2600, a partner position signal processing unit 2700, and a presentation unit 2800. The sensor unit 2100 includes the camera 2020 composed of an image sensor (including a plurality of image sensors) such as a CCD and a CMOS, a depth sensor using infrared light or the like, a microphone, etc. The encoding unit 2300 is a block compatible with a communication protocol such as H.320/H.323, and performs video encoding (H.26x), voice encoding (G.7xx), etc. The presentation unit 2080 includes a display for displaying an image, a speaker for making sound of voice, etc. Note that, in the following, description that relates to the voice will be omitted.

[1.3. Exemplary Configuration of System]

Figure 6:
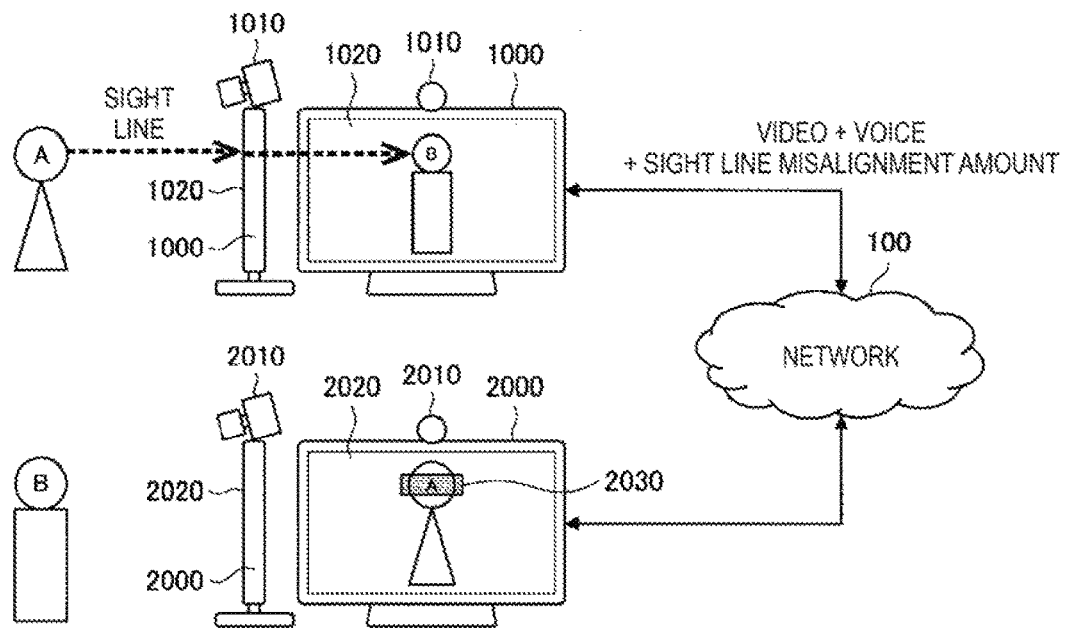
FIG. 6 is a schematic diagram illustrating a system of the first embodiment.

FIG. 6 is a schematic diagram illustrating a system of the present embodiment. As described above, the user A is displayed in the screen 2020 of the terminal 2000. Then, a marker (super) 2030, such as a pictorial figure and a picture, is displayed superimposed on the screen 2020 of the terminal 2000 of the user B, in order to inform what the user A looks at.

As illustrated in FIG. 6, when the user A looks at the face (eyes) of the user B on the screen 1020 of the terminal 1000, the marker 2030 is displayed superimposed at the position of the face (eyes) of the user A displayed on the screen 2020 of the terminal 2000 of the user B. At this, the marker 2030 is superimposed at a position that the user B can recognize without removing the sight line.

Also, when the user A does not look at the face of the user B on the screen 1020 of the terminal 1000, the marker 2030 is not displayed superimposed on the screen 2020 of the terminal 2000 of the user B.

Figure 7:
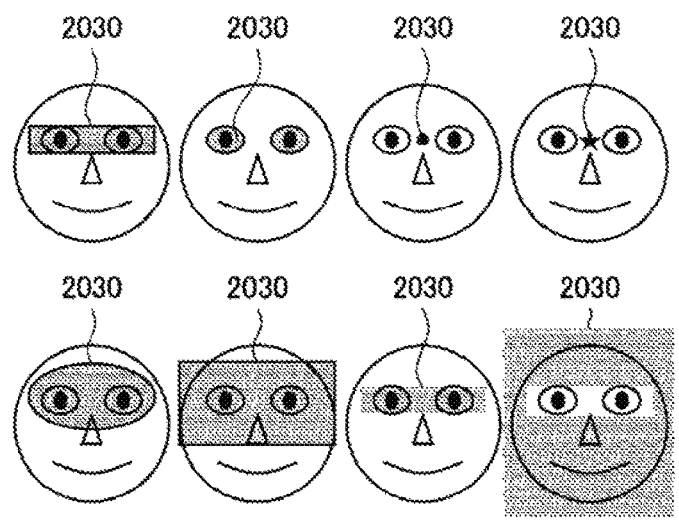
FIG. 7 is a schematic diagram illustrating an example of a marker.

FIG. 7 is a schematic diagram illustrating an example of the marker 2030. The color, the shape, the size, the brightness, and the transmittance of the marker 2030 are changeable as appropriate. Also, for example, the marker 2030 may be provided at other than the viewpoint position, so as to surround the viewpoint position. The transmittance, the brightness, and the color at other than the viewpoint position are also changeable.

According to the system of FIG. 6, the user B can determine whether or not the user A directs the sight line to (the eyes of) the face of the user B which is displayed on the screen 1020, by confirming the marker 2030 in the screen 2020.

Figure 8:
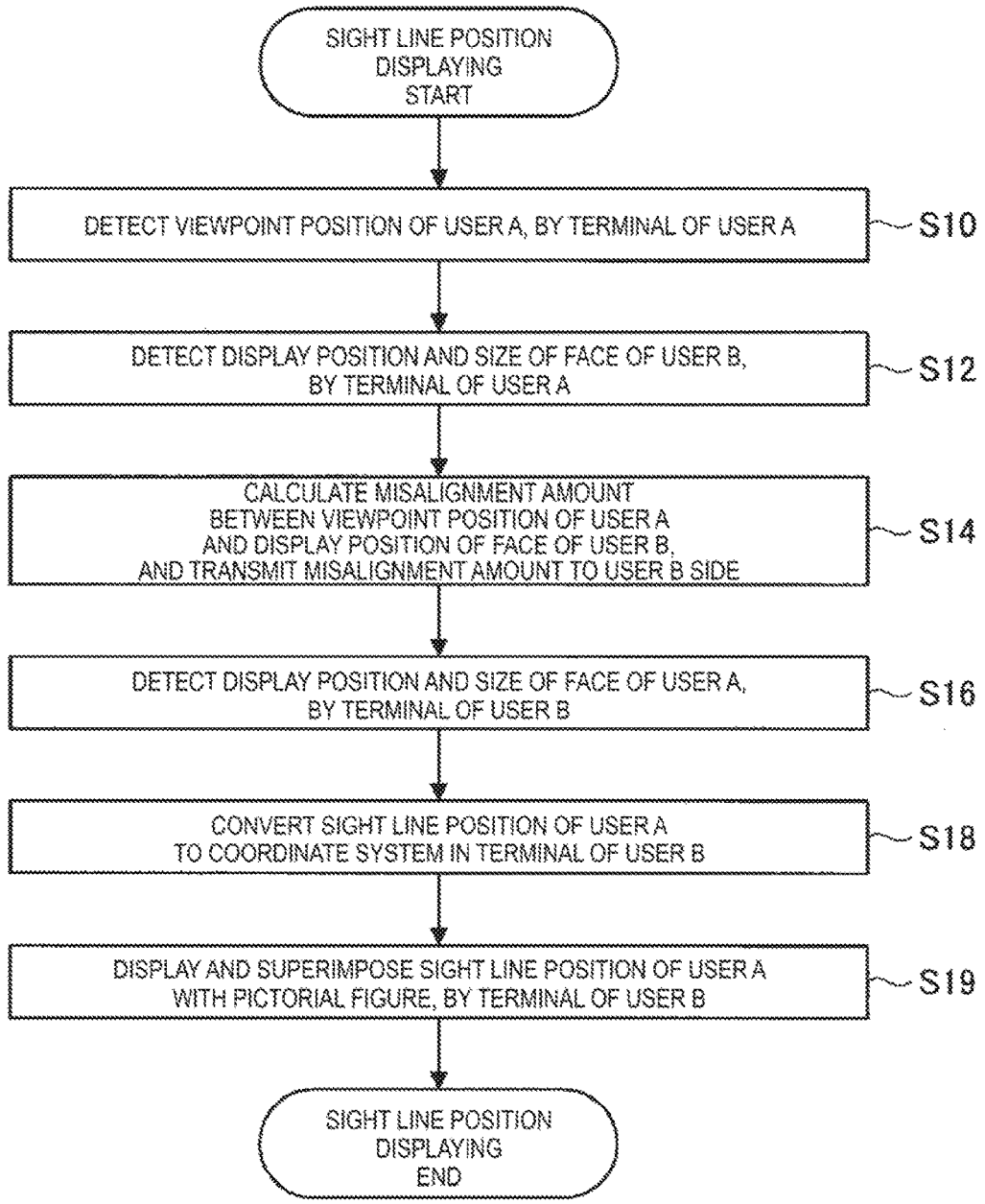
FIG. 8 is a flowchart illustrating a process of displaying a sight line position illustrated in FIG. 6.

FIG. 8 is a flowchart illustrating a process of displaying the sight line position (displaying the marker 2030) illustrated in FIG. 6. First, in step S10, the terminal 1000 of the user A detects the viewpoint position of the user A. In next step S12, the terminal 1000 of the user A detects the display position and the size of the face of the user B displayed on the screen 1020. In next step S14, the misalignment amount between the viewpoint position of the user A and the display position of the face of the user B is calculated and transmitted to the terminal 2000 of the user B. In next step S16, the terminal 2000 of the user B detects the display position and the size of the face of the user A displayed on the screen 2020. In next step S18, the sight line position of the user A is converted to the coordinate system of the terminal 2000 of the user B. In next step S19, the terminal 2000 of the user B displays and superimposes the sight line position of the user A with the marker 2030. After step S19, the process ends.

[1.4. Major Components of Terminal]

Figure 9:
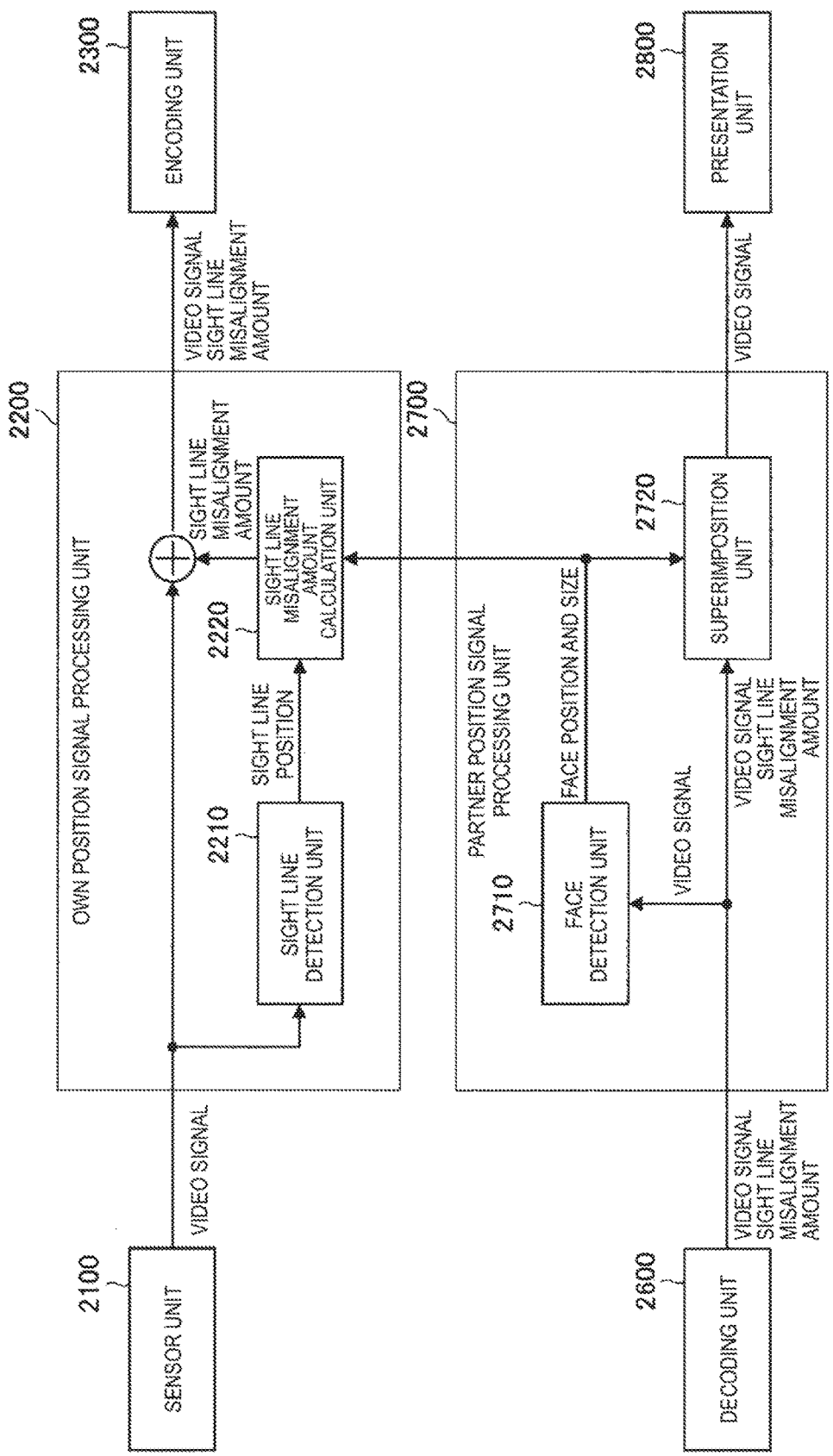
FIG. 9 is a block diagram illustrating, in detail, major components of a terminal that achieves displaying a sight line position illustrated in FIG. 6.

FIG. 9 is a block diagram illustrating, in detail, major components of the terminal 2000 that achieves displaying the sight line position illustrated in FIG. 6. Note that the terminal 1000 is configured in the same way as the terminal 2000. As illustrated in FIG. 9, the own position signal processing unit 2200 of the terminal 2000 includes a sight line detection unit 2210 and a sight line misalignment amount calculation unit 2220. Also, the partner position signal processing unit 2700 includes a face detection unit 2710 and a superimposition unit 2720. Note that, each component of the terminal 2000 illustrated in FIG. 5, FIG. 9, and other drawings may be configured with hardware (a circuit), or a central processing unit such as a CPU and a program (software) for causing this to function. In this case, the program may be stored in a recording medium, such as a memory provided inside the device or a memory connected from outside.

The video signal obtained by capturing an image of the user B by the camera 2010 of the sensor unit 2100 is input to the sight line detection unit 2210. The sight line detection unit 2210 detects the direction of the sight line of the user B from the captured image of the user B.

Also, the video signal and the sight line misalignment amount of the terminal 1000 transmitted from the terminal 1000 and decoded by the decoding unit 2600 are sent to the face detection unit 2710 and the superimposition unit 2720. The face detection unit 2710 detects the face position and the size of the user A, on the basis of the video signal. Note that the detection of the position and the size of the face from the image by the face detection unit 2710 can be performed by the method described in JP 2005-157679A, for example. In this method, the position and the size of the face are detected by the following procedure. First, a classifier of face region that weights and adds a plurality of weak classifiers is prepared (step A). A face image group and a non-face image group are input to perform machine learning of weight coefficients of step A (step B). The face region of the input image is detected by using the classifier after the machine learning of step B (step C).

The sight line misalignment amount calculation unit 2220 calculates the sight line misalignment amount of the user B, on the basis of the direction of the sight line detected by the sight line detection unit 2210 and the face position and the size of the user A detected by the face detection unit 2710. The sight line misalignment amount is sent to the encoding unit 2300 together with the video signal. Note that the detection of the sight line by the sight line detection unit 2210 can use the method described in JP 2006-202181A or JP H2-224637A, for example. In the method of JP 2006-202181A, the sight line is detected by the following procedure. First, a face image is acquired from the left and the right of the user (step D). The left and right faces are detected from the result of step D (step E). The direction of the face is detected from the result of step E (step F). The eyeball and the iris are detected from the result of step E (step G). The sight line direction of the user is detected from steps F, G (step H). Also, the method of JP H2-224637A detects the sight line by the following procedure. First, the position and the direction of the head are detected from the face image (step I). A feature point (the position of the black eye, etc.) of the eye is detected from the face image (step J). The sight line direction is detected from steps I, J (step K).

The superimposition unit 2720 superimposes, on the video signal, the marker 2230 calculated from the sight line misalignment amount of the user A received from the terminal 1000 and the face position and the size of the user A detected by the face detection unit 2710, and outputs the video signal to the presentation unit 2800.

Figure 10:
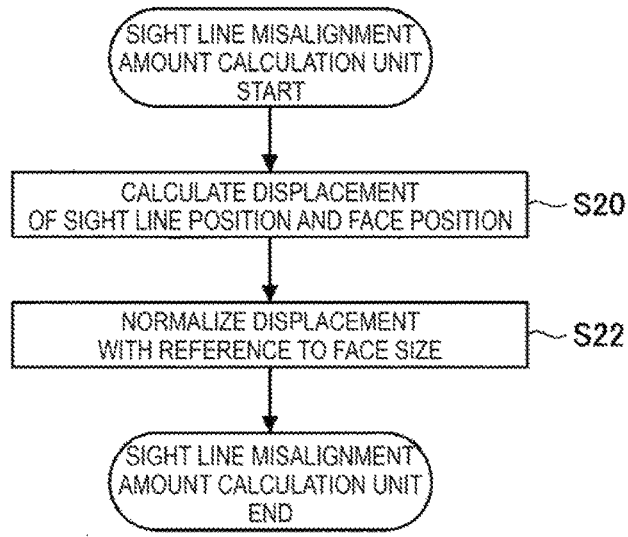
FIG. 10 is a flowchart illustrating a process by a sight line misalignment amount calculation unit.

FIG. 10 is a flowchart illustrating a process by the sight line misalignment amount calculation unit 2220. First, in step S20, displacements of the sight line position and the face position are calculated. In next step S22, the displacements are normalized with reference to the face size. After step S22, the process ends.

Figure 11:
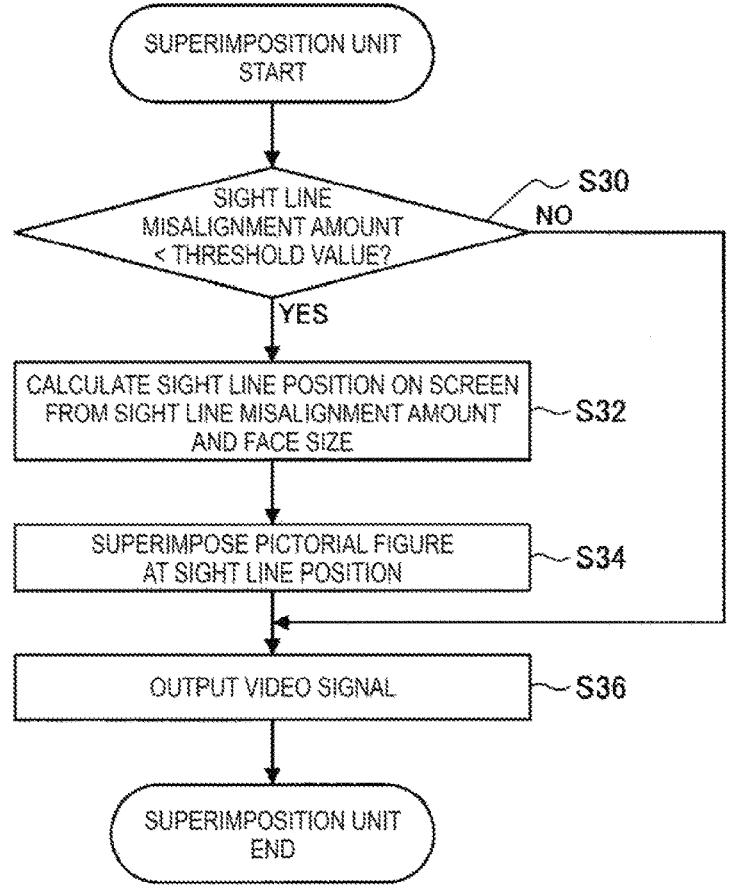
FIG. 11 is a flowchart illustrating a process by a superimposition unit.

FIG. 11 is a flowchart illustrating a process by the superimposition unit 2720. First, in step S30, it is determined whether or not the sight line misalignment amount is smaller than a predetermined threshold value, and the process proceeds to step S32 if the sight line misalignment amount is smaller than the predetermined threshold value. In step S32, the sight line position on the screen 2020 is calculated from the sight line misalignment amount and the face size. The marker 2030 is superimposed at the sight line position on the screen 2020 in next step S34, and the video signal is output in step S36.

Also, if the sight line misalignment amount is equal to or larger than the predetermined threshold value in step S30, the process proceeds to step S36, and outputs the video signal without superimposing the marker 2030.

Figure 12:
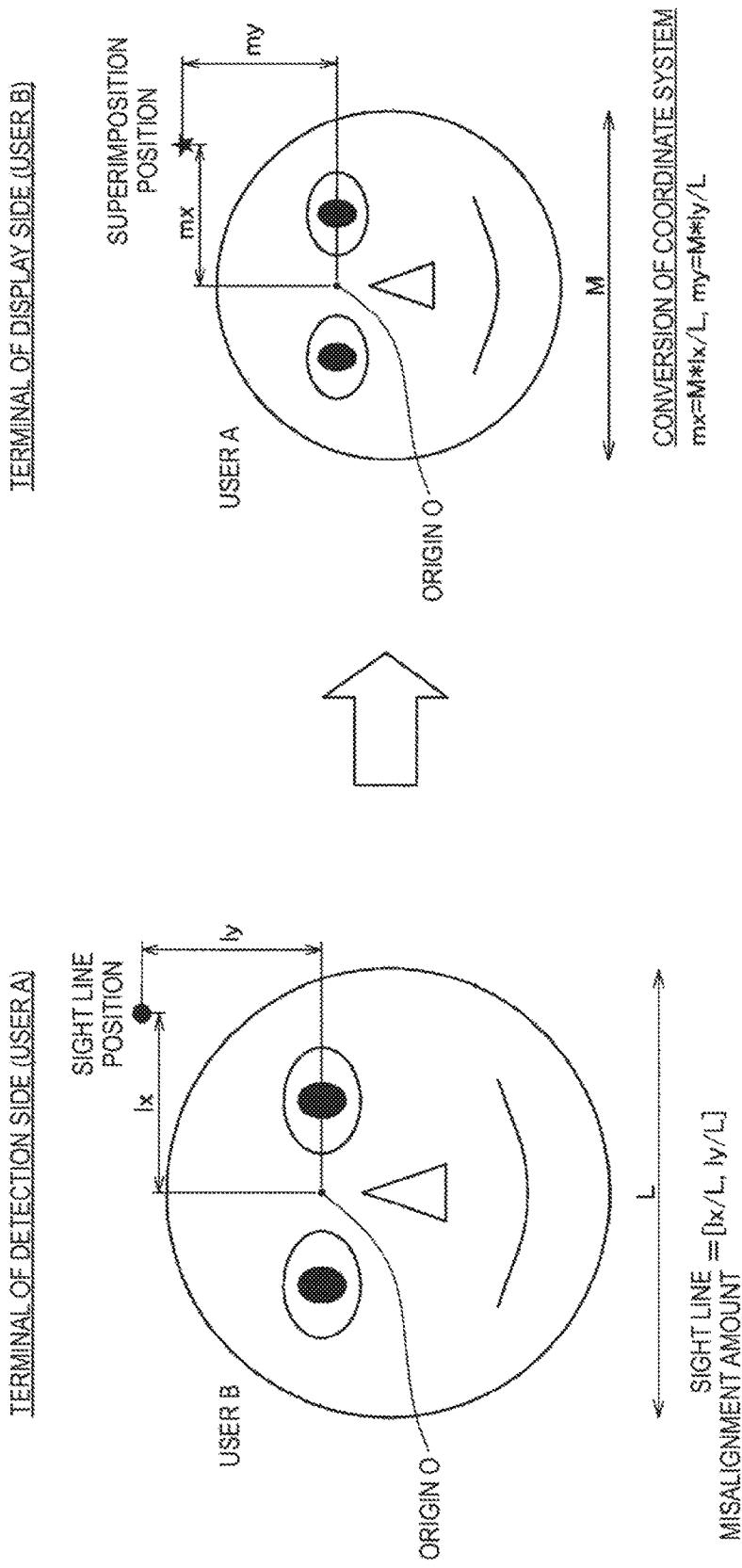
FIG. 12 is a schematic diagram for describing a method of calculating a sight line misalignment amount by a sight line misalignment amount calculation unit.

FIG. 12 is a schematic diagram for describing a method for calculating the sight line misalignment amount by the sight line misalignment amount calculation unit 2220. The sight line misalignment amount is a vector amount representing how the sight line is misaligned from reference coordinates, with respect to the size of the face displayed on the screen. The dimension of the size of the face is information such as a horizontal size or a vertical size of the face. Also, the reference coordinates (origin) are set to the position between eyebrows, for example.

As illustrated in FIG. 12, the detection side device (the terminal 1000 of the user A) calculates the misalignment between the origin O (the position between the eyebrows) of the face of the user B displayed on the screen 1020 and the sight line position P of the user A, as the sight line misalignment amount. The sight line misalignment amount can be expressed in the XY coordinate system by the below equation. The size of the face of the user B on the screen is set to L. This sight line misalignment amount is sent to the terminal 2000 together with the video signal.

$$\text{Sight line misalignment amount} = [lx/L,\ ly/L]$$

The display-side device (the terminal 2000 of the user B) converts the coordinate system on the basis of the sight line misalignment amount sent from the terminal 1000, and calculates the sight line misalignment amount m=(mx, my). The sight line misalignment amount mx obtained by the conversion of the coordinate system can be expressed by the below equations, where M is the size of the face of the user A on the screen 2020 of the terminal 2000.

$$mx = M*lx/L$$

$$my = M*ly/L$$

According to the first embodiment, the user B can visually confirm the sight line position of the user A, in addition to the face of the user A of the communication partner displayed on the screen of the terminal 2000, as described above. Then, when the user A sets the sight line on the face of the user B displayed on the own terminal 1000, the user B visually confirms the marker 2030 superimposed on the face of the user A on the screen 2020 of the terminal 2000. Thus, the user B can easily recognize whether or not the user A directs the sight line to the face of the user B on the screen 1020 of the own terminal 1000.

2. Second Embodiment

[2.1. Overview of System]

Figure 13:
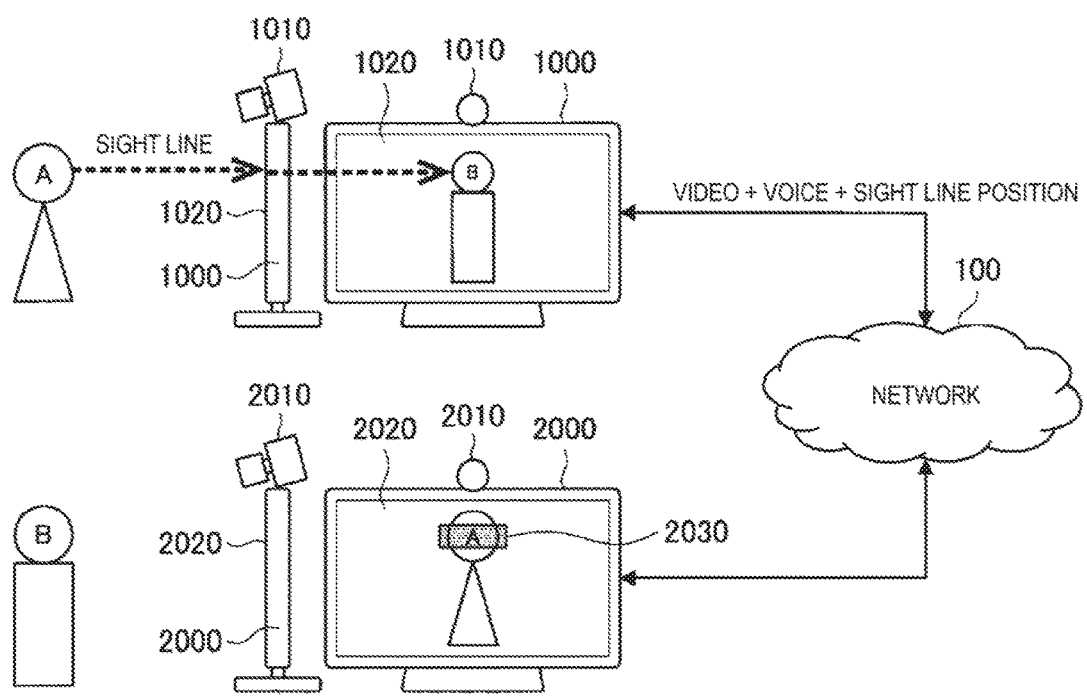
FIG. 13 is a schematic diagram illustrating a system of a second embodiment.

Next, a second embodiment of the present disclosure will be described. FIG. 13 is a schematic diagram illustrating a system of the second embodiment. The basic configuration of the system according to the second embodiment is the same as the first embodiment. Although in the first embodiment the sight line misalignment amount is transmitted between the terminal 1000 and the terminal 2000, the second embodiment differs from the first embodiment in sending the sight line position instead of the sight line misalignment amount and calculating the sight line misalignment amount by a reception-side device. The configurations of the terminals 1000, 2000 are the same as the first embodiment illustrated in FIG. 4.

[2.2. Major Components of Terminal]

Figure 14:
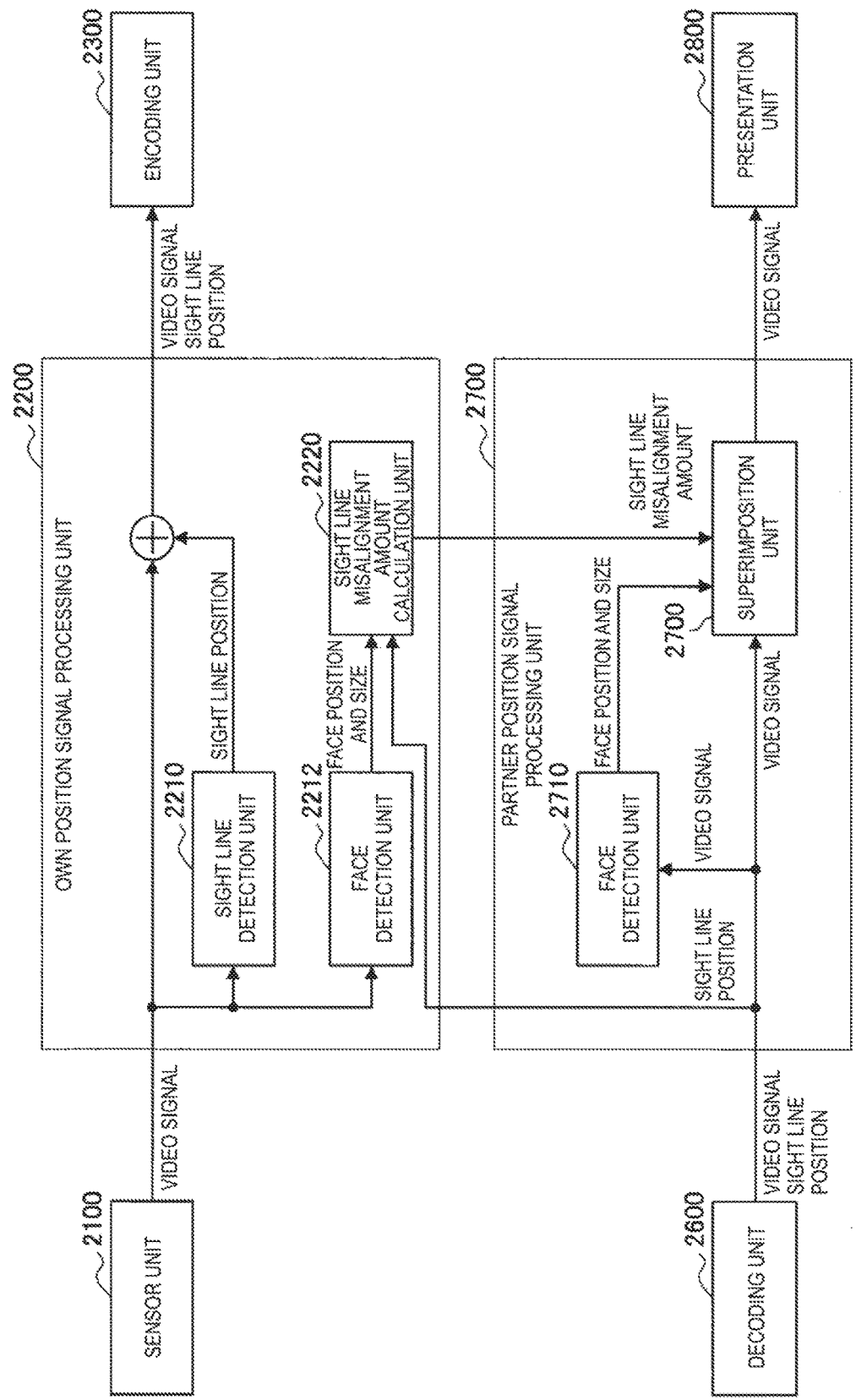
FIG. 14 is a block diagram illustrating, in detail, major components of a terminal of the second embodiment.

FIG. 14 is a block diagram illustrating, in detail, major components of the terminal 2000 of the second embodiment. Note that the terminal 1000 is configured in the same way as the terminal 2000. As illustrated in FIG. 14, the own position signal processing unit 2200 of the terminal 2000 includes a sight line detection unit 2210, a face detection unit 2212, and a sight line misalignment amount calculation unit 2220. Also, the partner position signal processing unit 2700 includes a face detection unit 2710 and a superimposition unit 2720.

In the second embodiment, the video signal obtained by capturing an image of the user B by the camera 2010 of the sensor unit 2100 is input to the sight line detection unit 2210 and the face detection unit 2212. The sight line detection unit 2210 detects the sight line position of the user B in the same way as the first embodiment. In the second embodiment, the sight line misalignment amount is not calculated on the basis of the sight line position, but the detected sight line position is sent to the encoding unit 2300 together with the video signal.

Also, the video signal of the terminal 1000 and the sight line position of the user A transmitted from the terminal 1000 are decoded by the decoding unit 2600. The sight line position of the user A is sent to the sight line misalignment amount calculation unit 2220. The sight line misalignment amount calculation unit 2220 calculates the sight line misalignment amount of the user A, on the basis of the face position and the size of the user B detected by the face detection unit 2212 and the sight line position of the user A received from the terminal 1000.

In the same way as the first embodiment, the face detection unit 2710 detects the face position and the size of the user A on the basis of the video signal. The superimposition unit 2720 superimposes, on the video signal, the marker 2230 calculated from the sight line misalignment amount of the user A calculated by the sight line misalignment amount calculation unit 2220 and the face position and the size of the user A detected by the face detection unit 2710, and outputs the video signal to the presentation unit 2800.

As described above, according to the second embodiment, the sight line position is sent between the terminal 1000 and the terminal 2000, and the sight line misalignment amount is calculated by the reception-side device. Thereby, in the same way as the first embodiment, when the user A sets the sight line on the face of the user B displayed on the own terminal 1000, the user B can visually confirm the marker 2030 superimposed on the face of the user A of the communication partner on the screen 2020 of the terminal 2000.

3. Third Embodiment

[3.1. Overview of System]

Next, a third embodiment of the present disclosure will be described. The third embodiment calibrates the sight line position of the partner user to an optimal position, in a state in which the marker indicating the sight line position of the partner user is displayed superimposed on the face of the partner user by the method of the first or second embodiment.

Figure 15:
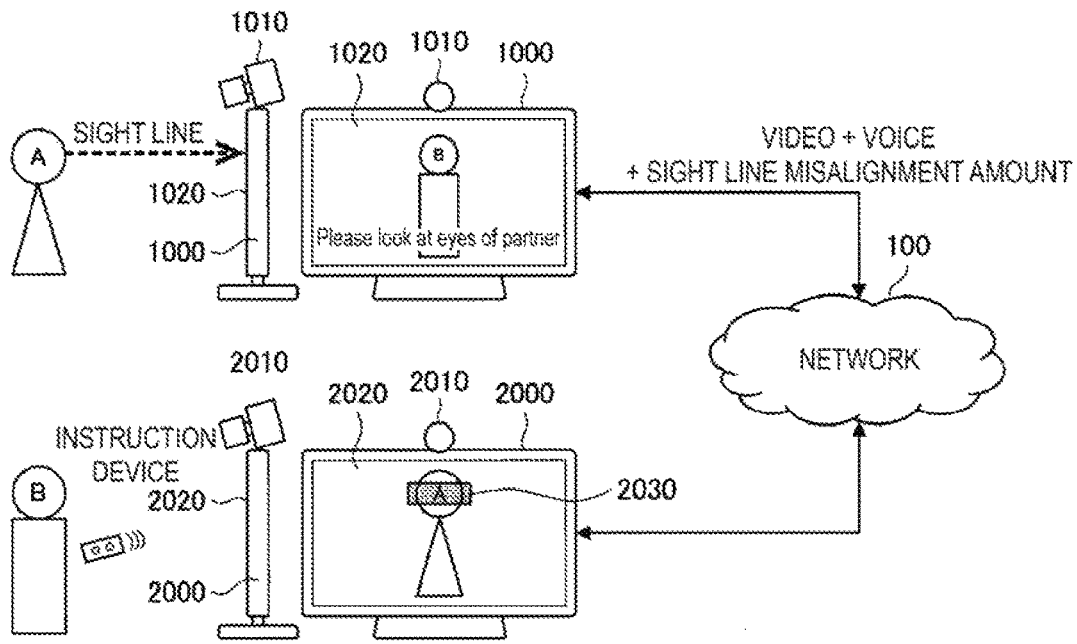
FIG. 15 is a schematic diagram illustrating a system of a third embodiment.

FIG. 15 is a schematic diagram illustrating a system of the third embodiment. The basic configuration of the system according to the third embodiment is the same as the first embodiment. As illustrated in FIG. 13, in the third embodiment, an announcement "please look at eyes of partner" is displayed on the screen of the terminal 1000, for the purpose of looking at the eyes of the user B of the partner. Also, a voice guidance "please look at eyes of partner" may be output. In this state, the user B calibrates the sight line of the image of the user A displayed on the terminal 2000 by using an instruction device 3000, and corrects the sight line of the user A to the front.

Figure 16A:
FIG. 16A is a schematic diagram illustrating a situation of calibration.
Figure 16B:
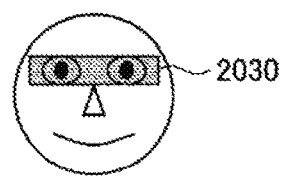
FIG. 16B is a schematic diagram illustrating a situation of calibration.

FIGS. 16A and 16B are schematic diagrams illustrating situations of the calibration. When the cameras 1010, 2012 of the terminals 1000, 2000 are located at the upper portions of the screens 1020, 2020 as illustrated in FIG. 15, the sight line of the user A is displayed looking downward as illustrated in FIG. 16A on the screen 2010 of the terminal 2000, even if the user A is directed to the front, as described in FIG. 2. In the third embodiment, in a state in which the above announcement is displayed and the marker 2030 is displayed at the position of the eyes of the user A on the screen 2020 of the terminal 2000, the calibration is performed from the state illustrated in FIG. 16A to the state of the eyes of the user A directed toward the front as illustrated in FIG. 16B. This creates a state in which the user A looks at the eyes of the image of the user B on the screen 1020 of the terminal 1000, and in which the eyes of the image of the user A look at the user B on the screen 2020 of the terminal 2000. Note that the change of the sight line from FIG. 16A to FIG. 16B can be performed by the technology described in Non-Patent Literature 2. In the technology described in Non-Patent Literature 2, first, the position of the eyeball is tracked and identified (step L). The position of the eyeball after conversion is decided from a target sight line direction (step M); and the position of the eyeball is moved by performing image processing of warping the pixel in different directions for different pixels (step N). A warping amount is decided, depending on the size of the eye, the distance from the center of the eyeball, etc (step O).

In the terminal 2000 of the user B, the announcement "please look at eyes of partner" is displayed in the same way. When the user B looks at the eyes of the image of the user A in the screen 2020, the marker 1030 is displayed at the position of the eyes of the image of the user B, on the screen 1020 of the terminal 1000 of the user A. In this state, the user A performs the same calibration as FIGS. 16A and 16B, in order to create a state in which the user B looks at the eyes of the image of the user A on the screen 2020 of the terminal 2000, and in which the eyes of the image of the user B look at the user A on the screen 1020 of the terminal 1000.

Thereby, the users A, B of both sides have an eye contact in the same way as reality, achieving smooth communication.

FIG. 17 is a flowchart illustrating a process of the third embodiment. First, in step S40, the user B instructs a calibration start. In next step S42, a text that prompts a look at the eyes of the partner (the user B) in the screen 1020 is displayed superimposed on the terminal 1000 of the user A. In next step S44, the sight line position (the marker 2030) of the user A is displayed superimposed at the position of the eyes of the user A displayed on the terminal 2000 of the user B, by the user A looking at the eyes of the partner (the user B) on the screen 1020.

In next step S46, it is determined whether or not the sight line of the user A displayed on the screen 2020 of the terminal 2000 of the user B is directed to the user B. Then, if the sight line of the user A displayed on the screen 2020 of the terminal 2000 of the user B is not directed to the user B, the process proceeds to step S48, and the user B instructs the sight line conversion by means of the instruction device, to direct the eyes of the user A to the user B. In next step S50, the sight line conversion is performed on the basis of the sight line conversion amount instructed in step S48.

On the other hand, if the sight line of the user A displayed on the screen 2020 of the terminal 2000 of the user B is directed to the user B in step S46, the calibration ends. When video meeting or the like is application, initial setting is performed to obtain a state in which the sight lines are aligned with each other, by performing the procedure before a start of meeting. Although the above example illustrates an example in which the viewpoint is converted in the vertical direction, taking an example of a case in which the camera is at the top (bottom), the viewpoint can be converted in the horizontal direction when the camera is at the left (right) in the same way.

[3.2. Major Components of Terminal]

FIG. 18 is a schematic diagram illustrating a configuration of the terminal 2000 according to the third embodiment. The basic configuration is the same as FIG. 5, but unlike the configuration of FIG. 5, the direction of the sight line in the image of the user A in the screen 2020 can be corrected in the video signal received from the terminal 1000 of the user A of the partner, by issuing an instruction with the instruction device 3000.

Figure 19:
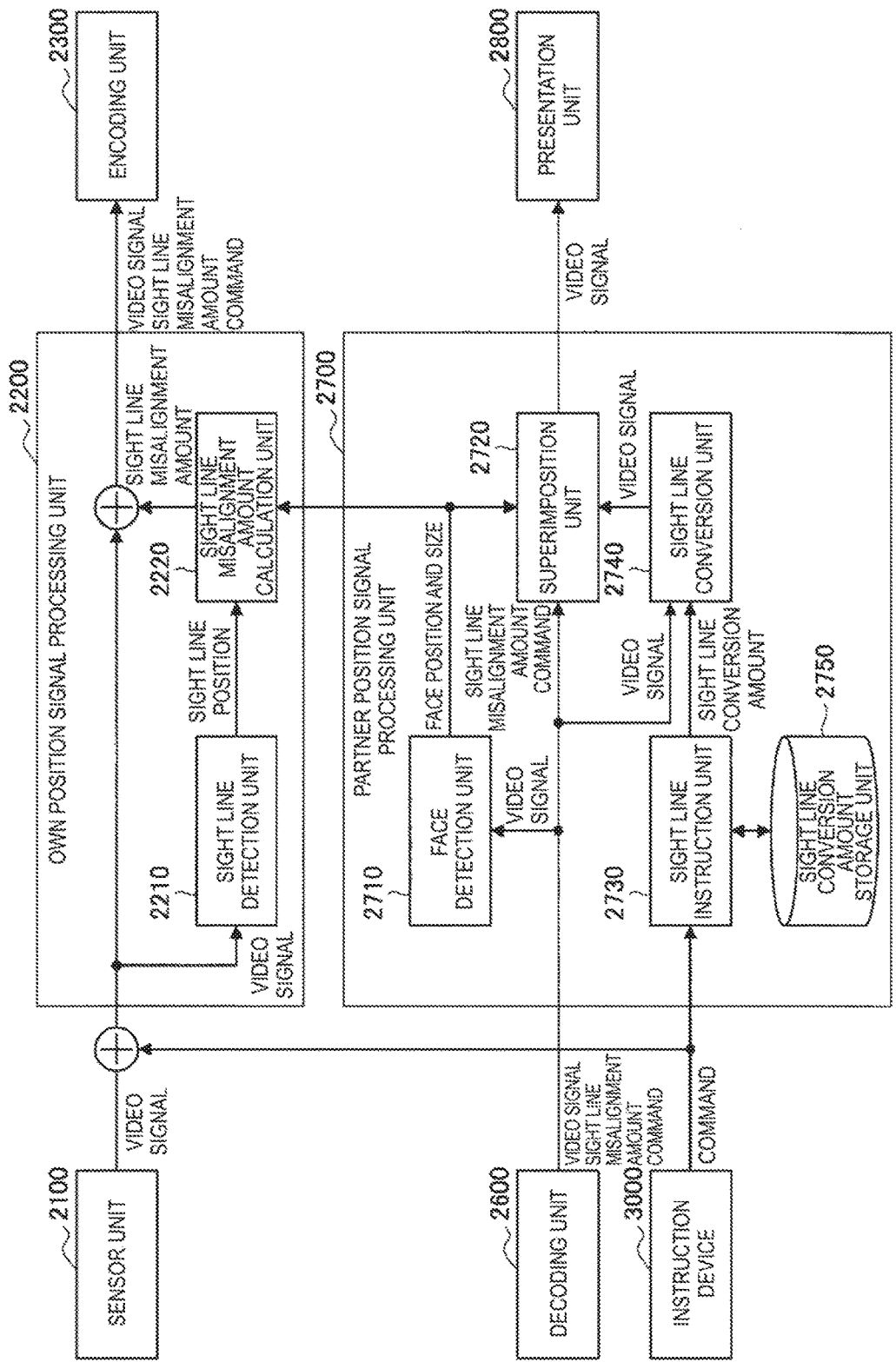
FIG. 19 is a block diagram illustrating, in detail, major components of a terminal that achieves displaying a sight line position illustrated in FIG. 18.

FIG. 19 is a block diagram illustrating, in detail, major components of the terminal 2000 that achieves displaying the sight line position illustrated in FIG. 18. The basic configuration is the same as FIG. 9, but the partner position signal processing unit 2700 further includes a sight line instruction unit 2730, a sight line conversion unit 2740, and a sight line conversion amount storage unit 2750.

At the time of calibration from FIGS. 16A to 16B, a command, such as "+1" and "+2", is sent to the sight line instruction unit 2730 from the instruction device 3000 by the operation of the user B. Here, the sight line of the user A in the screen 2020 is changed to the upward direction by a "+" command, and the sight line of the user A in the screen 2020 is changed to the downward direction by a "−" command. Also, as the absolute value of the command is larger, the change amount in the direction of the sight line increases.

The sight line change amount storage unit 2750 stores the value of the command designated from the instruction device 3000. The video signal is input in the sight line conversion unit 2730, from the decoding unit 2600. The sight line conversion unit 2730 performs sight line conversion on the basis of the sight line conversion amount designated from the sight line instruction unit 2730. Thereby, the direction of the sight line changes, as illustrated in FIG. 16B. The superimposition unit 2720 superimposes the marker 2030 and the video signal in which the direction of the sight line is changed by the sight line conversion unit 2730, and sends the video signal to the presentation unit 2800.

Also, the command by the instruction device 3000 is superimposed on the video signal from the sensor unit and the sight line misalignment amount, and is encoded by the encoding unit, and is sent to the terminal 1000. Also, the decoding unit receives the command instructed by the user A, as well as the video signal and the sight line misalignment amount, from the terminal 1000. The received command is sent to the superimposition unit. Thus, the superimposition unit can determine whether or not the calibration is turned on in the terminal 1000, by receiving the command. Then, when the calibration is turned on in the terminal 1000, the text described above is displayed superimposed on the screen 2020.

Figure 20:
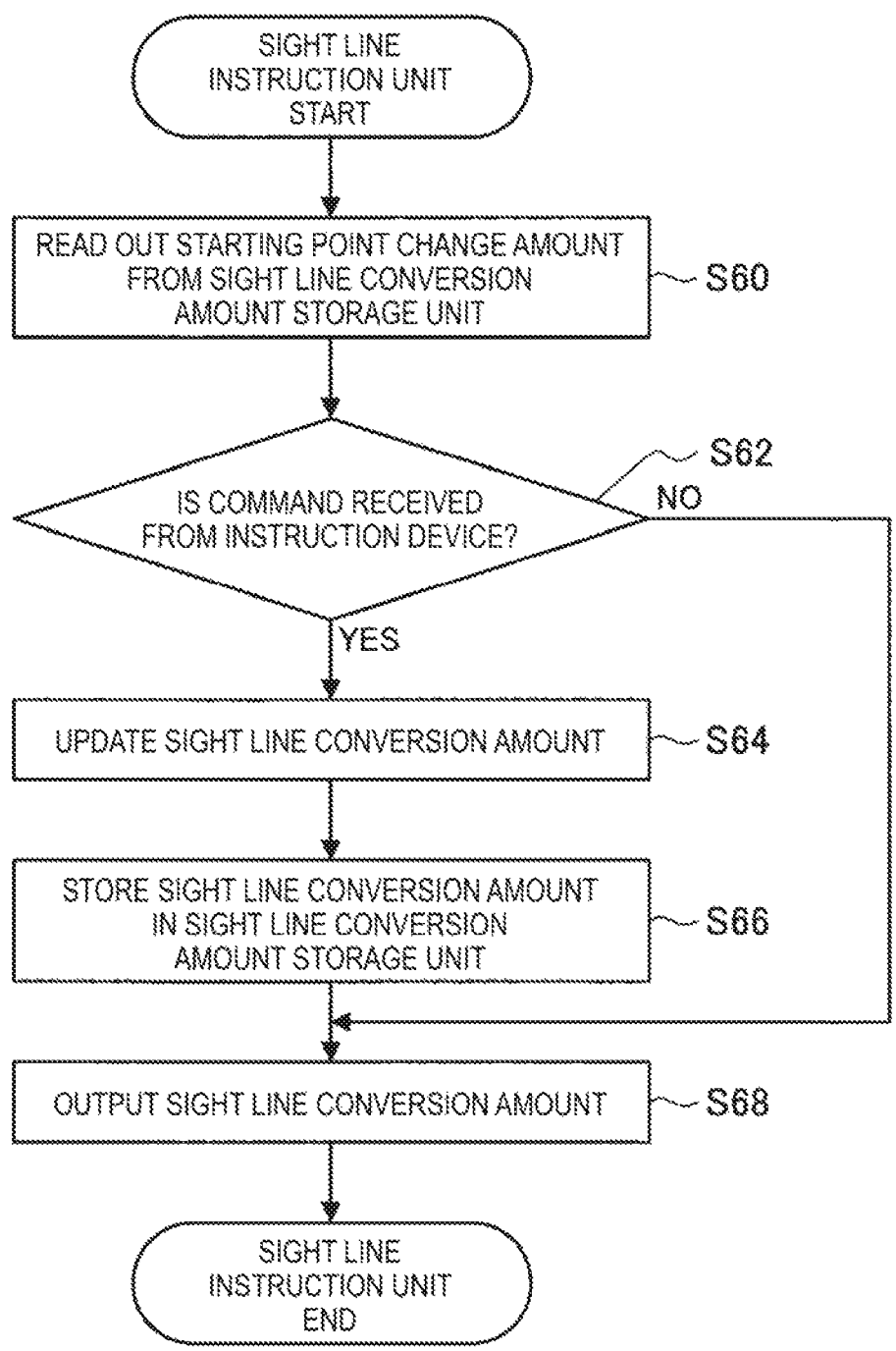
FIG. 20 is a flowchart illustrating a process by a sight line instruction unit.

FIG. 20 is a flowchart illustrating a process by the sight line instruction unit 2730. First, in step S60, the sight line conversion amount stored in the sight line conversion amount storage unit 2750 is read out. In next step S62, it is determined whether or not the command is received from the instruction device 3000, and the process proceeds to step S64 if the command is not received. In step S64, the sight line conversion amount is updated on the basis of the received command. In next step S66, the updated sight line conversion amount is stored in the sight line conversion amount storage unit 2750. In next step S68, the updated sight line conversion amount is output to the sight line conversion unit 2730.

On the other hand, if the command is not received from the instruction device 3000 in step S62, the process proceeds to step S68, and outputs the sight line conversion amount read out from the sight line conversion amount storage unit 2750 to the sight line conversion unit 2730.

Figure 21:
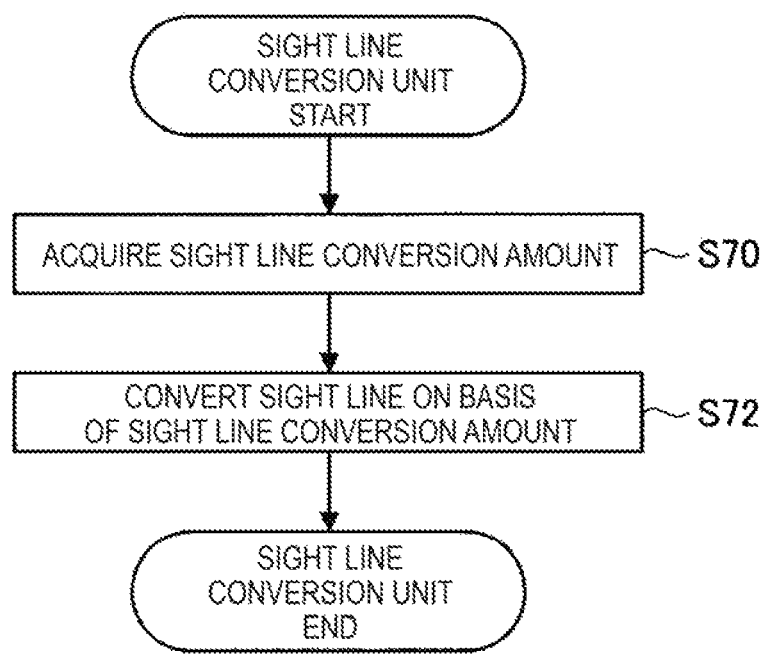
FIG. 21 is a flowchart illustrating a process by a sight line conversion unit.

FIG. 21 is a flowchart illustrating a process by the sight line conversion unit 2730. First, in step S70, the sight line conversion amount is acquired from the sight line instruction unit 2730. In next step S72, the sight line in the screen is converted on the basis of the sight line conversion amount. After step S72, the process ends.

Figure 22:
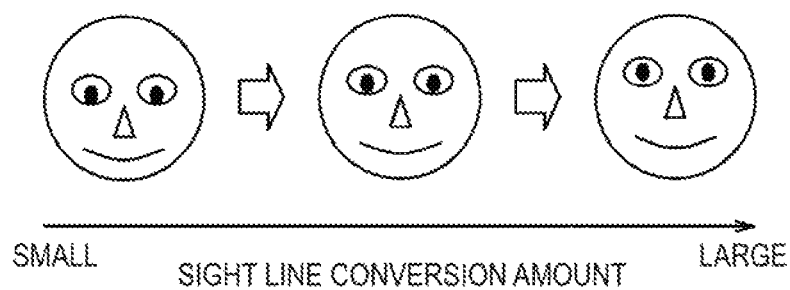
FIG. 22 is a schematic diagram illustrating a sight line conversion amount and a change of a sight line in a screen.

FIG. 22 is a schematic diagram illustrating the sight line conversion amount and the change of the sight line in the screen. As illustrated in FIG. 22, as the value of the sight line conversion amount becomes larger, the direction of the sight line in the screen changes to the upward direction.

Figure 23:
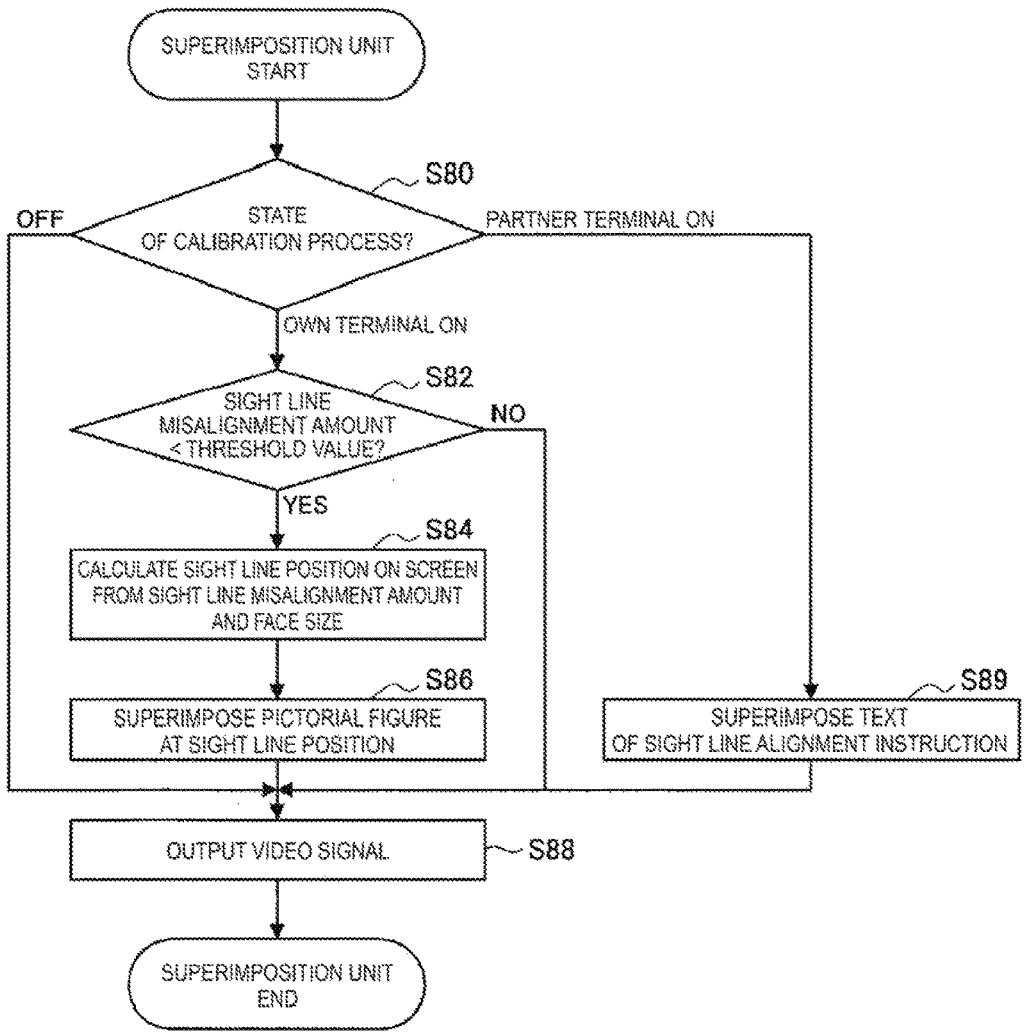
FIG. 23 is a flowchart illustrating a process of a superimposition unit.

FIG. 23 is a flowchart illustrating a process of the superimposition unit. First, in step S80, the state of the calibration process is determined, and it is determined whether the calibration process is turned on in the own terminal, whether the calibration process is turned on or turned off in the partner terminal. If the calibration process is turned on in the own terminal, the same process as steps S30 to S36 of FIG. 11 is performed. That is, in step S82, it is determined whether or not the sight line misalignment amount is smaller than a predetermined threshold value. Then, if the sight line misalignment amount is smaller than the predetermined threshold value, the process proceeds to step S84, and calculates the sight line position on the screen 2020 from the sight line misalignment amount and the face size. The marker 2030 is superimposed at the sight line position on the screen 2020 in next step S86, and the video signal is output in step S88.

In step S80, if the calibration process is turned on in the partner terminal, the process proceeds to step S89, and displays and superimposes the text of the sight line alignment instruction on the screen 2020. After step S89, the process proceeds to step S88, and outputs the video signal. Also, if the calibration process is turned off in the own terminal and the partner terminal in step S80, the process proceeds to step S88, and outputs the video signal.

Figure 24:
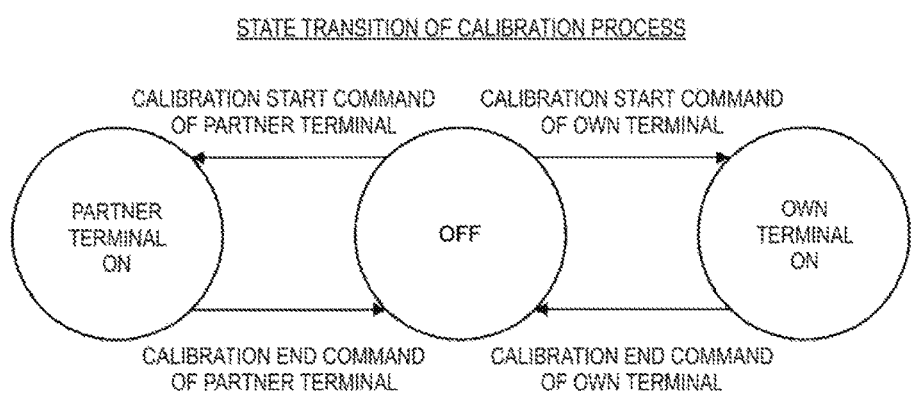
FIG. 24 is a schematic diagram illustrating a state transition of a calibration process.

FIG. 24 is a schematic diagram illustrating a state transition of the calibration process. Starting from a state in which the calibration process is turned off in both of the own terminal and the partner terminal, the calibration process is turned on by sending a calibration start command of the own terminal to the own terminal. Also, the calibration process is turned on in the partner terminal, by sending a calibration start command of the partner terminal to the partner terminal.

Also, the calibration is turned off by a calibration end command of the own terminal. Also, the calibration is turned off by a calibration end command of the partner terminal.

As described above, according to the third embodiment, the calibration is performed in a state in which the marker 2030 is displayed at the position of the eyes of the user A on the screen 2020 of the terminal 2000 and in which the eyes of the user A are directed toward the front. Also, the calibration is performed in a state in which the marker 1030 is displayed at the position of the eyes of the user B on the screen 1020 of the terminal 1000 and in which the eyes of the user B are directed toward the front. Thereby, the users A, B of both sides have an eye contact in the same way as reality, achieving smooth communication.

4. Fourth Embodiment

[4.1. Overview of System]

Next, a fourth embodiment of the present disclosure will be described. The fourth embodiment performs the calibration in the same way as the third embodiment, and performs the calibration of sight line alignment by means of a digital mirror, without performing communication with the partner terminal. Initial setting is performed to obtain a state in which the sight lines are aligned with each other, by performing this flow, before use start of the digital mirror. In the following, detail will be described.

Figure 25:
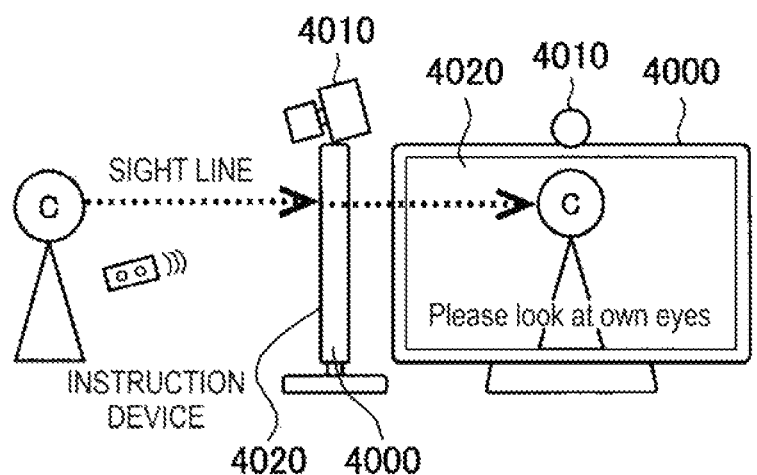
FIG. 25 is a schematic diagram illustrating a system of the third embodiment.

FIG. 25 is a schematic diagram illustrating a system of the third embodiment. In the first to third embodiments, the video signal obtained by image capturing of the cameras 1010, 2010 is transmitted to the partner terminal, and displaying is performed by the video signal transmitted to the partner terminal. The fourth embodiment includes only one terminal (here a terminal 4000), and the image obtained by image capturing of a camera 4010 of the terminal 4000 is displayed on a screen 4020 of the terminal 4000. Then, the calibration is performed in a state in which a user C of the terminal 4000 is displayed on the screen 4020 by digital mirror, to optimally adjust the sight line position.

Figure 26A:
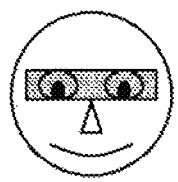
FIG. 26A is a schematic diagram illustrating a situation in which a direction of a sight line changes by calibration.
Figure 26B:
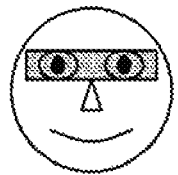
FIG. 26B is a schematic diagram illustrating a situation in which a direction of a sight line changes by calibration.

As illustrated in FIG. 25, a text "please look at own eyes" is displayed on the screen 4020. When the user C looks at the own eyes displayed on the screen 4020 in this state, the sight line is directed downward as illustrated in FIG. 26A, in a state in which the calibration is not performed, as described in FIG. 2. By performing the same calibration as the third embodiment in this state, the sight line is directed to the front, as illustrated in FIG. 26B.

Also, the position and the size of the user C displayed on the screen 4020 changes, depending on the relative positional relationship between the user C and the terminal 4000. It is desirable to be displayed at a front position in life-size, in order to function as the digital mirror. In the fourth embodiment, the user C performs the calibration illustrated in FIG. 27 by using the instruction device 3000, and thereby the user C is displayed at an adequate size and position in the screen 4020.

When the distance between the user C and the terminal 2000 is adequate as illustrated in the middle of FIG. 27, the user C is displayed in life-size at the center of the screen 2020. On the other hand, when the user C and the terminal 2000 are far, the camera 2010 is at the top of the screen 2020, and therefore the user C is displayed small at a high position in the screen 2020. Also, on the other hand, when the user C and the terminal 2000 are close, the user C is displayed large at a low position in the screen 2020.

Figure 28:
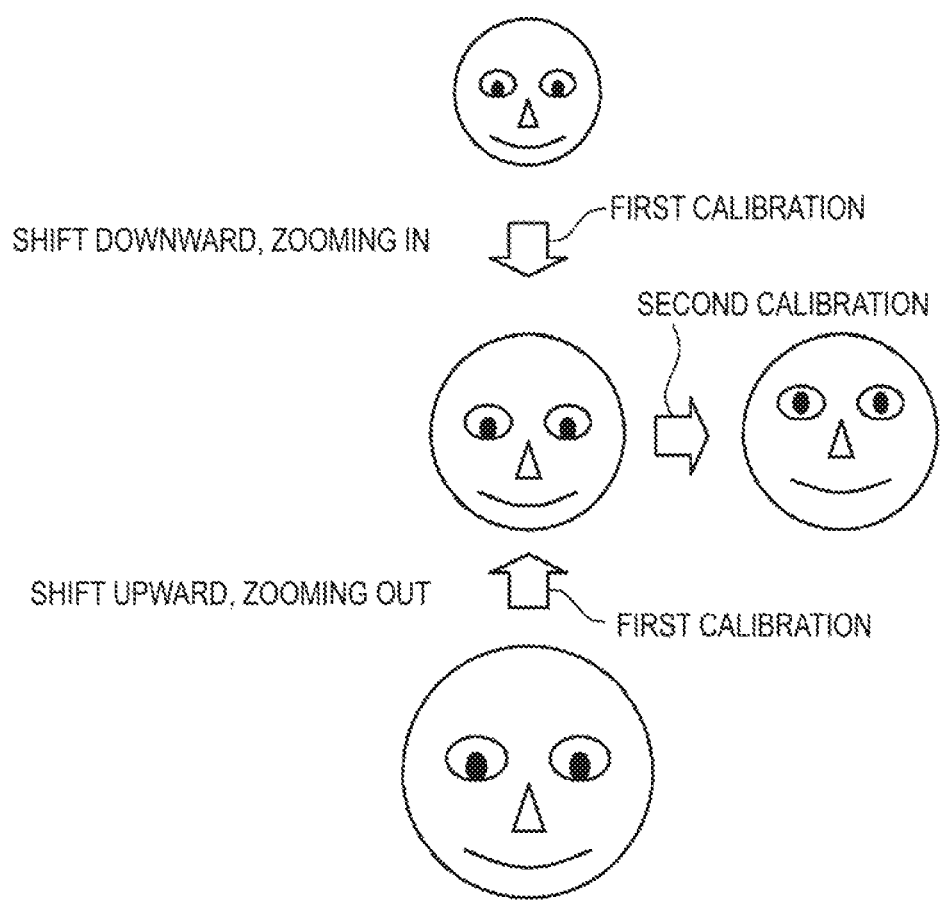
FIG. 28 is a schematic diagram illustrating calibration in the fourth embodiment.

Hence, in the fourth embodiment, two-step calibration illustrated in FIG. 28 is performed. As illustrated in FIG. 28, the calibration (first calibration) for optimizing the size and the position of the user C in the screen 2020 is performed first. Then, after this calibration is completed, the same calibration (second calibration) for changing the sight line as the third embodiment is performed.

Figure 29:
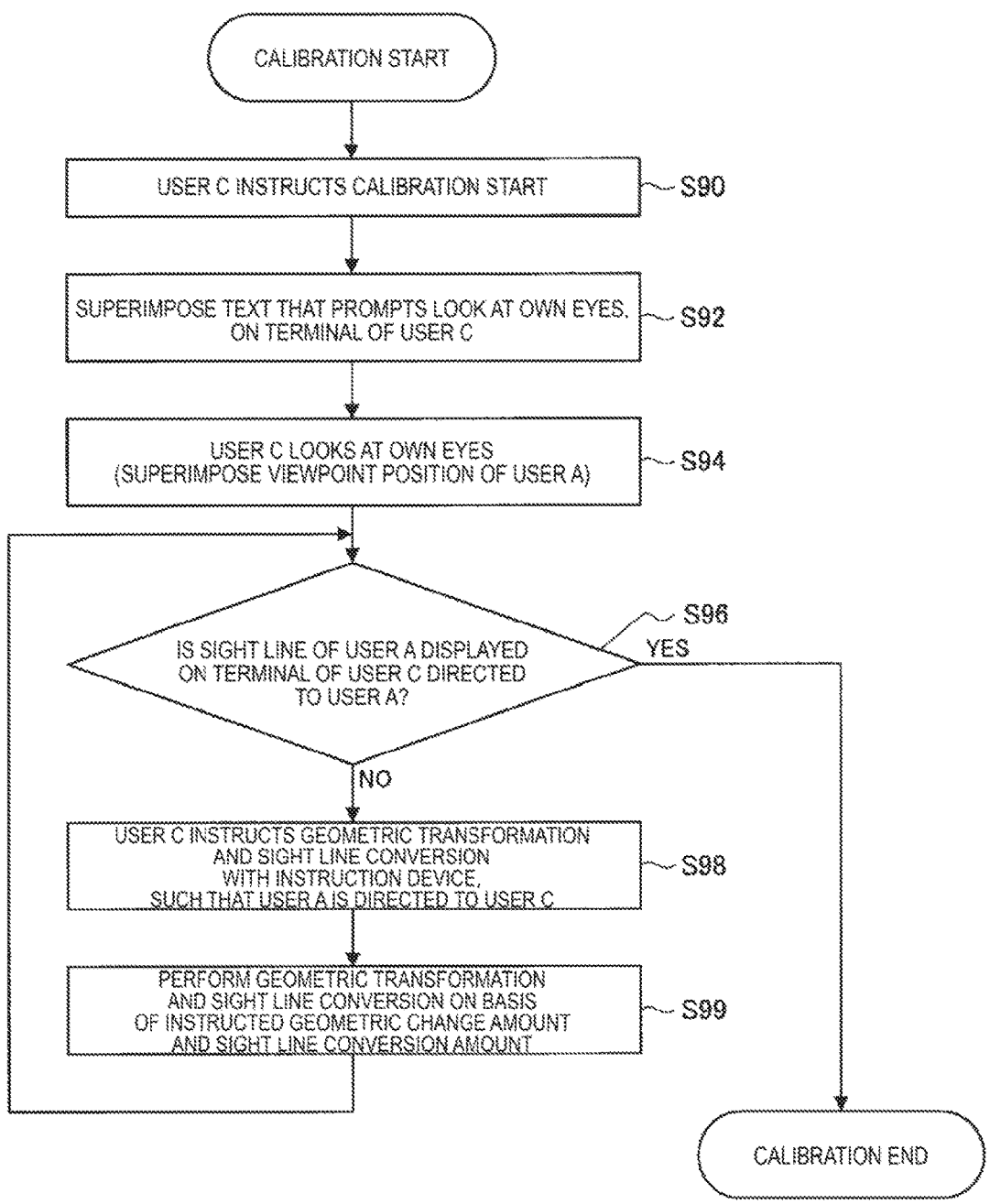
FIG. 29 is a flowchart illustrating a process of the fourth embodiment.

FIG. 29 is a flowchart illustrating a process of the fourth embodiment. First, in step S90, the user C instructs a calibration start. In next step S92, a text that prompts a look at the own eyes is displayed superimposed on the screen 2020 of the terminal 2000 of the user C. In next step S94, the user C looks at the own eyes in accordance with the text. At this, the viewpoint position of the user C may be detected by the camera 2010, and displayed superimposed on the screen 2020.

In next step S96, it is determined whether or not the sight line of the user C displayed on the screen 4020 of the terminal 4000 of the user C is directed to the eyes of the user C himself or herself, and the process proceeds to step S98 if the sight line is not directed to the eyes of the user C himself or herself. In step S98, the geometric transformation and the sight line conversion are instructed by the instruction device 3000, so that the sight line of the user C in the screen 4020 is directed to himself or herself. In next step S99, the terminal 4000 executes the geometric transformation and the sight line conversion, on the basis of an instructed geometric change amount and a sight line conversion amount. Note that the geometric transformation corresponds to the first calibration described above, and performs zooming in, zooming out, and top, bottom, left, and right shift of the video. The sight line conversion corresponds to the second calibration.

On the other hand, in step S96, the process ends, if the sight line of the user C in the screen 2020 is directed to the eyes of the user C himself or herself.

[4.2. Exemplary Configuration of Terminal]

Figure 30:
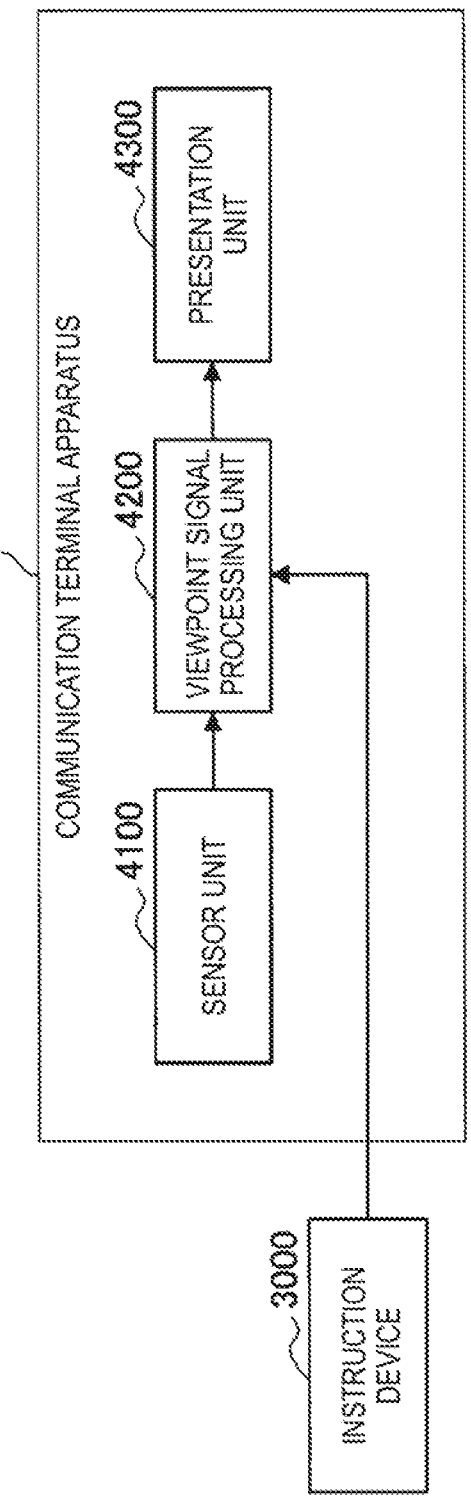
FIG. 30 is a schematic diagram illustrating a configuration of a terminal according to the fourth embodiment.

FIG. 30 is a schematic diagram illustrating a configuration of the terminal 4000 according to the fourth embodiment. As illustrated in FIG. 4, the terminal 4000 includes a sensor unit 4100, a viewpoint signal processing unit 4200, and a presentation unit 4300. Note that the digital mirror display is performed, and thus the communication function is not essential, unlike the first to third embodiments. The viewpoint signal processing unit 4200 performs both of the geometric transformation and the sight line conversion, on the basis of the command from the instruction device 3000. Note that the function of the geometric transformation can be incorporated in the third embodiment.

Figure 31:
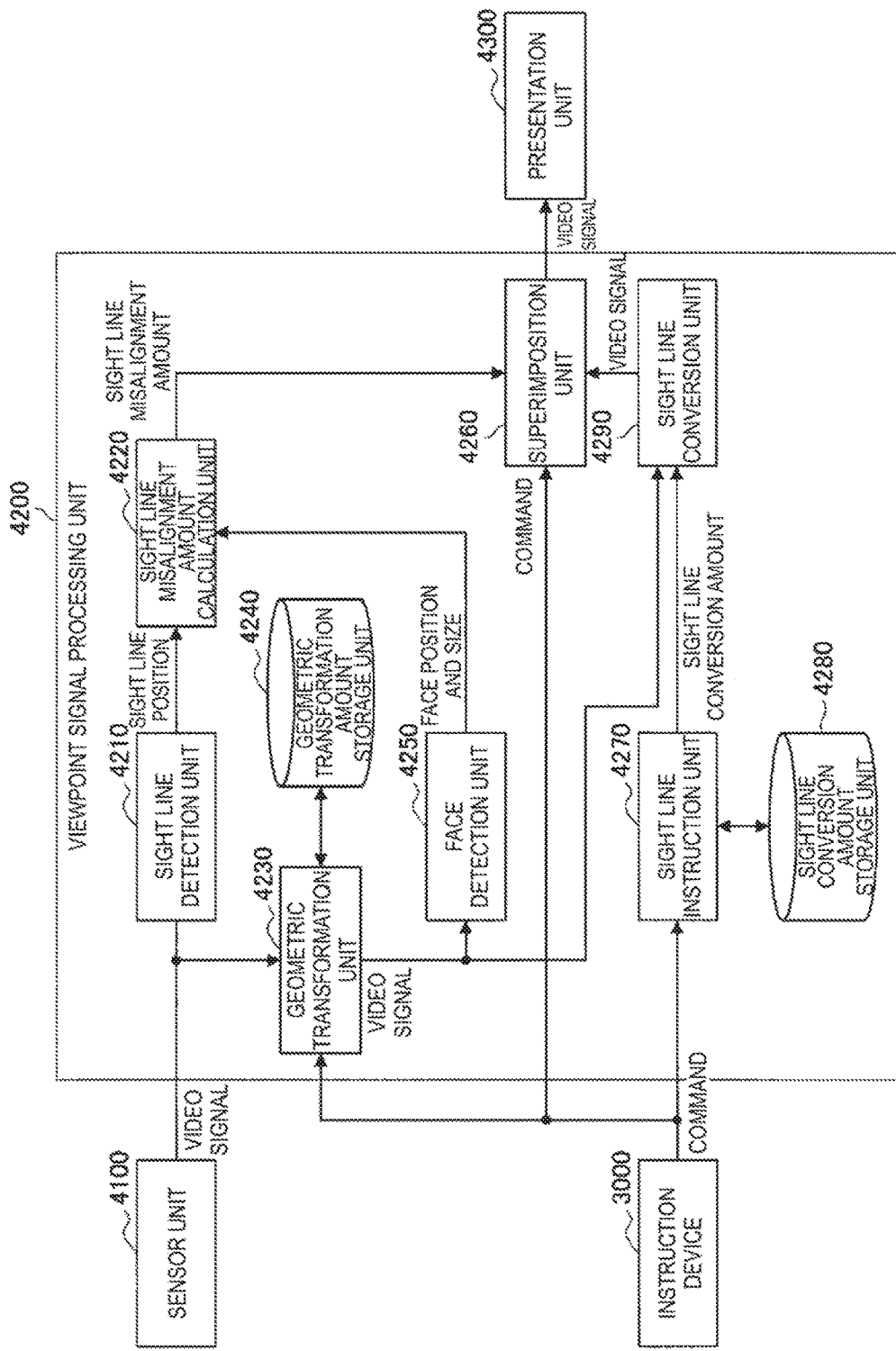
FIG. 31 is a schematic diagram illustrating a configuration of a viewpoint signal processing unit.

FIG. 31 is a schematic diagram illustrating a configuration of the viewpoint signal processing unit 4200. The viewpoint signal processing unit 4200 includes a sight line detection unit 4210, a sight line misalignment amount calculation unit 4220, a geometric transformation unit 4230, a geometric transformation amount storage unit 4240, a face detection unit 4250, a superimposition unit 4260, a sight line instruction unit 4270, a sight line conversion amount storage unit 4280, and a sight line conversion unit 4290. Basic functions, such as the sight line detection unit 4210, the sight line misalignment amount calculation unit 4220, the face detection unit 4250, the superimposition unit 4260, the sight line instruction unit 4270, the sight line conversion amount storage unit 4280, and the sight line conversion unit 4290, are the same as the third embodiment.

Figure 32:
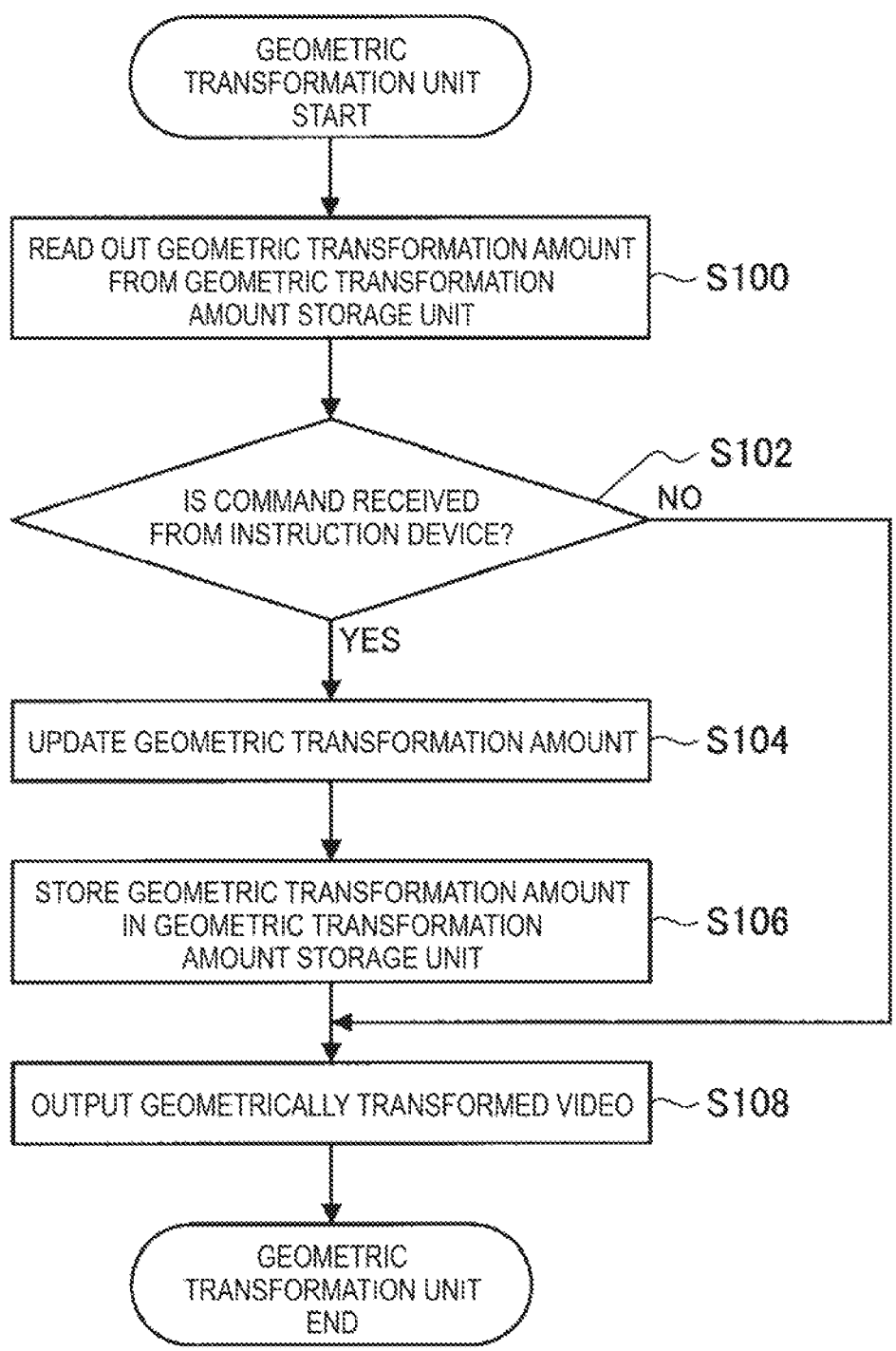
FIG. 32 is a flowchart illustrating a process of a geometric transformation unit.

FIG. 32 is a flowchart illustrating a process of the geometric transformation unit. First, in step S100, the geometric transformation amount is read out from the geometric transformation amount storage unit 4280. In next step S102, it is determined whether or not a command is received from the instruction device 3000, and if the command is received, the geometric transformation amount is updated in step S104. In next step S106, the updated geometric transformation amount is stored in the geometric transformation amount storage unit 4280. In next step S108, the video signal geometrically transformed by the updated geometric transformation amount is output to the presentation unit 430. After step S108, the process ends.

Also, if the command from the instruction device 3000 is not received in step S102, the process proceeds to step S108, and outputs the video geometrically transformed by the geometric transformation amount read out from the geometric transformation amount storage unit 4280 to the presentation unit 430.

Figure 33:
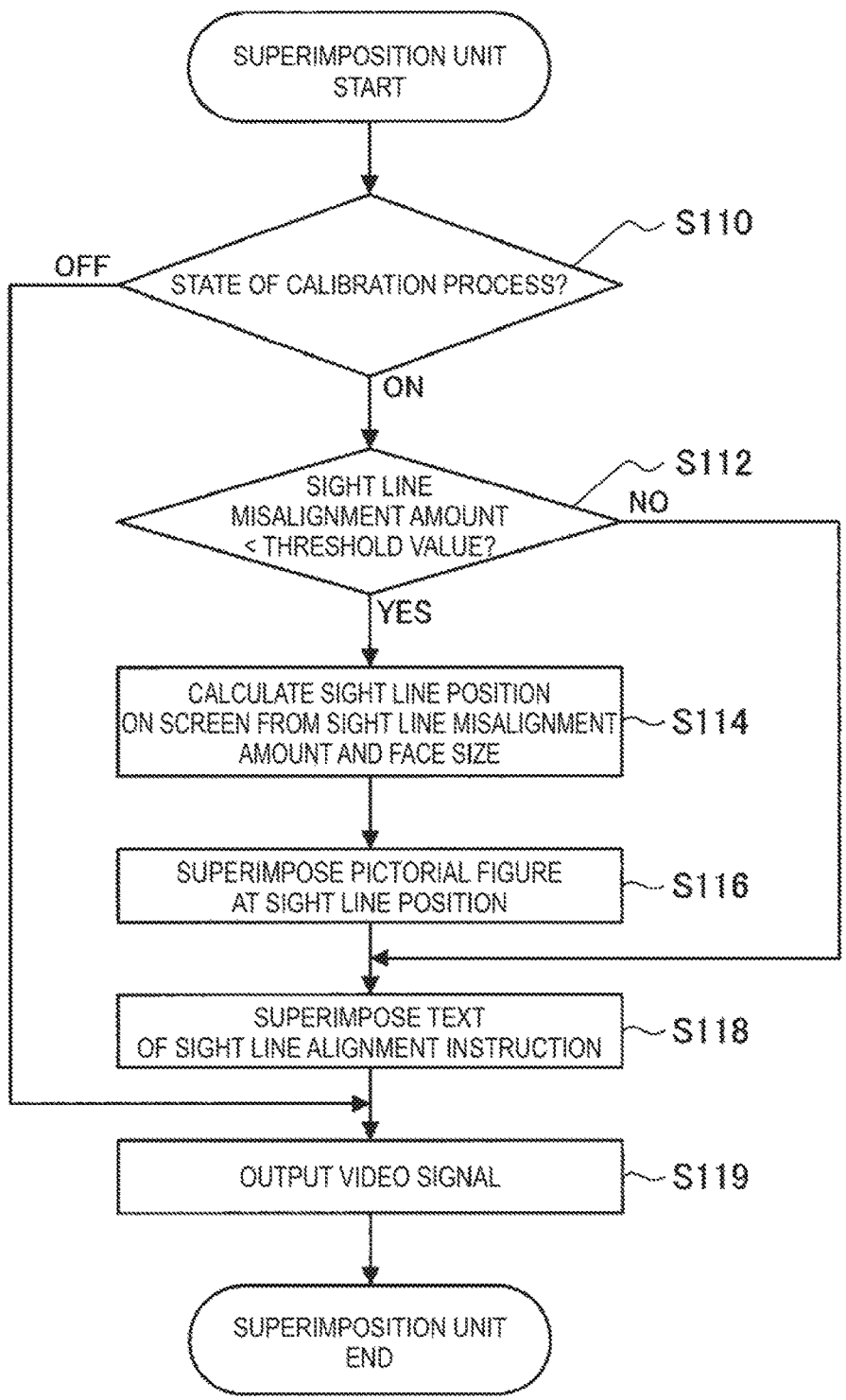
FIG. 33 is a flowchart illustrating a process of a superimposition unit.

FIG. 33 is a flowchart illustrating a process of the superimposition unit. First, in step S110, the state of the calibration process is determined, and it is determined whether the calibration process is turned on or turned off in the terminal. If the calibration process is turned on in the terminal, the process proceeds to step S112, and it is determined whether or not the sight line misalignment amount is smaller than a predetermined threshold value. Then, if the sight line misalignment amount is smaller than the predetermined threshold value, the process proceeds to step S114, and calculates the sight line position on the screen 4020 of the terminal 4000 from the sight line misalignment amount and the face size. In next step S116, the marker is superimposed at the sight line position on the screen. In next step S118 the text of the sight line alignment instruction is superimposed on the video signal, and in next step S119 the video signal is output to the presentation unit 430. After step S119, the process ends. Note that, in the case of the digital mirror, even if the marker is not superimposed, the user himself or herself can independently look at the eyes of the face of the image of himself or herself which is displayed on the screen 4020. Thus, the display of the marker is not essential.

Figure 34:
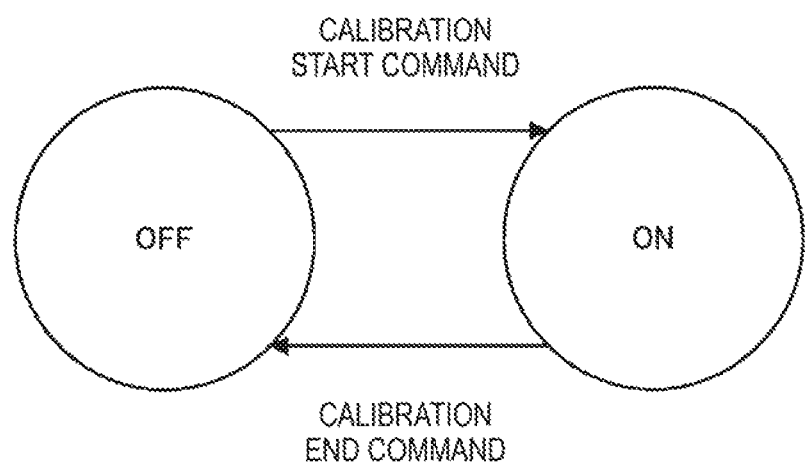
FIG. 34 is a schematic diagram illustrating a state transition of a calibration process.

FIG. 34 is a schematic diagram illustrating a state transition of the calibration process. The state of the calibration process is turned on by a calibration start command, and the state of the calibration process is turned off by a calibration end command.

As described above, according to the fourth embodiment, the displayed eyes of the user C himself or herself can be directed to the front, by performing the calibration of the sight line position, when the user C himself or herself is displayed on the screen 4020 of the terminal 4000 like the digital mirror. Also, the face can be located at an optimal position, by calibrating the size and the position of the displayed face of the user C.

5. Fifth Embodiment

[5.1. Overview of System]

Next, a fifth embodiment of the present disclosure will be described. In the third embodiment, it is envisaged that the sight lines are not aligned with each other, when the face position of the user A is misaligned. In the fifth embodiment, even when the face position of the user A moves slightly, the sight lines are not easily off from each other by performing registration at a plurality of face positions at the time of the calibration.

Figure 35:
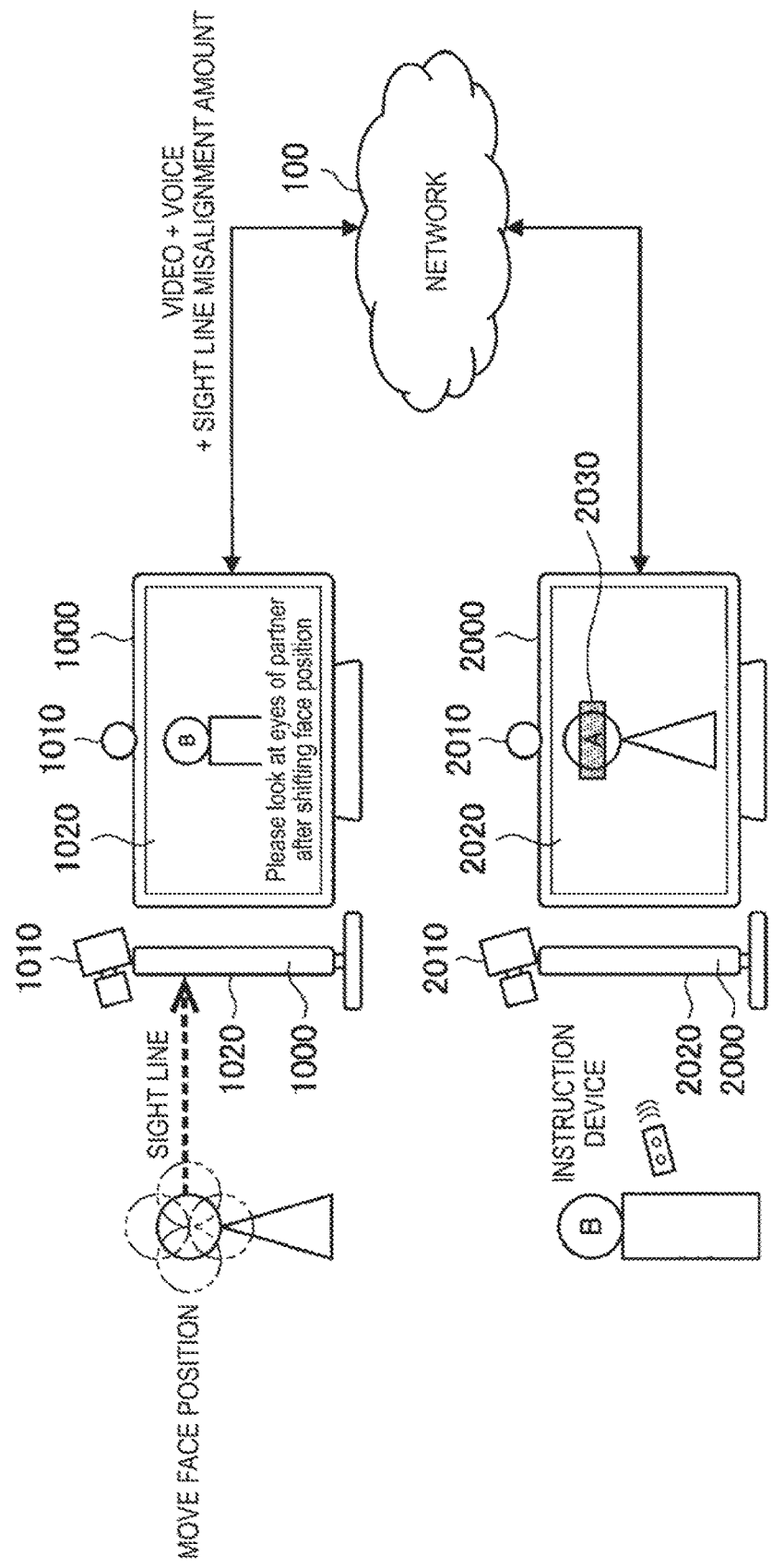
FIG. 35 is a schematic diagram illustrating a system of a fifth embodiment.

FIG. 35 is a schematic diagram illustrating a system of the fifth embodiment. The basic configuration of the system according to the fifth embodiment is the same as the third embodiment. In the fifth embodiment, a text "please look at eyes of partner after shifting face position" is displayed on the terminal 1000. Note that the direction in which the face position is to be shifted may be instructed in order, like "please shift face position upward" and "please shift face position to right", and the mark may be displayed superimposed at the target position and "please shift face position to position of this mark" may be instructed for example. The user A moves the face position in accordance with this text. The user B performs the calibration in response to a plurality of face positions of the user A.

Figure 36:
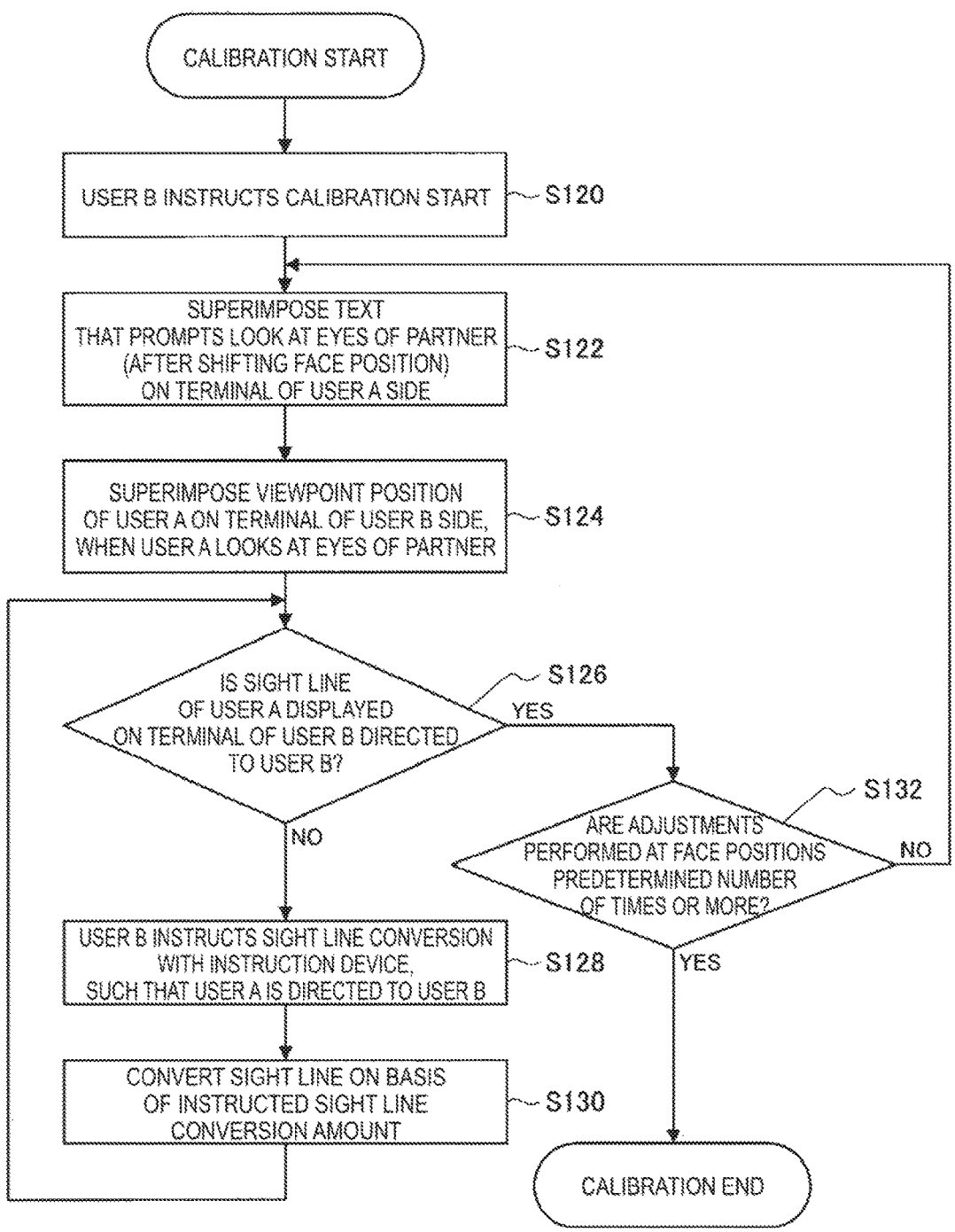
FIG. 36 is a flowchart illustrating a process of the fifth embodiment.

FIG. 36 is a flowchart illustrating a process of the fifth embodiment. First, in step S120, the user B instructs a calibration start. In next step S122, a text that prompts the face position to be shifted to look at the eyes of the partner is superimposed on the terminal 1000 of the user A. In next step S124, if the user A looks at the eyes of the partner, the viewpoint position (the marker 2030) of the user A is superimposed on the terminal 2000 of the user B side. In next step S126, it is determined whether or not the sight line of the user A displayed on the terminal 2000 is directed to the user B, and the process proceeds to step S128 if the sight line of the user A is directed to the user B. In step S128, the user B instructs the sight line conversion by means of the instruction device, in such a manner that the sight line of the user A is directed to the user B. In next step S130, the terminal 2000 performs the sight line conversion on the basis of the instructed sight line conversion amount.

On the other hand, if the sight line of the user A displayed on the terminal 2000 is not directed to the user B in step S26, the process proceeds to step S132. In step S132, it is determined whether or not adjustments have been performed at the face positions of the user A a predetermined number of times or more, and the process ends if the adjustments have been performed at the face positions the predetermined number of times or more. If the adjustments have not been performed at the face positions the predetermined number of times or more, the process returns to step S122, to repeatedly perform the following process.

[5.2. Major Components of Terminal]

Figure 37:
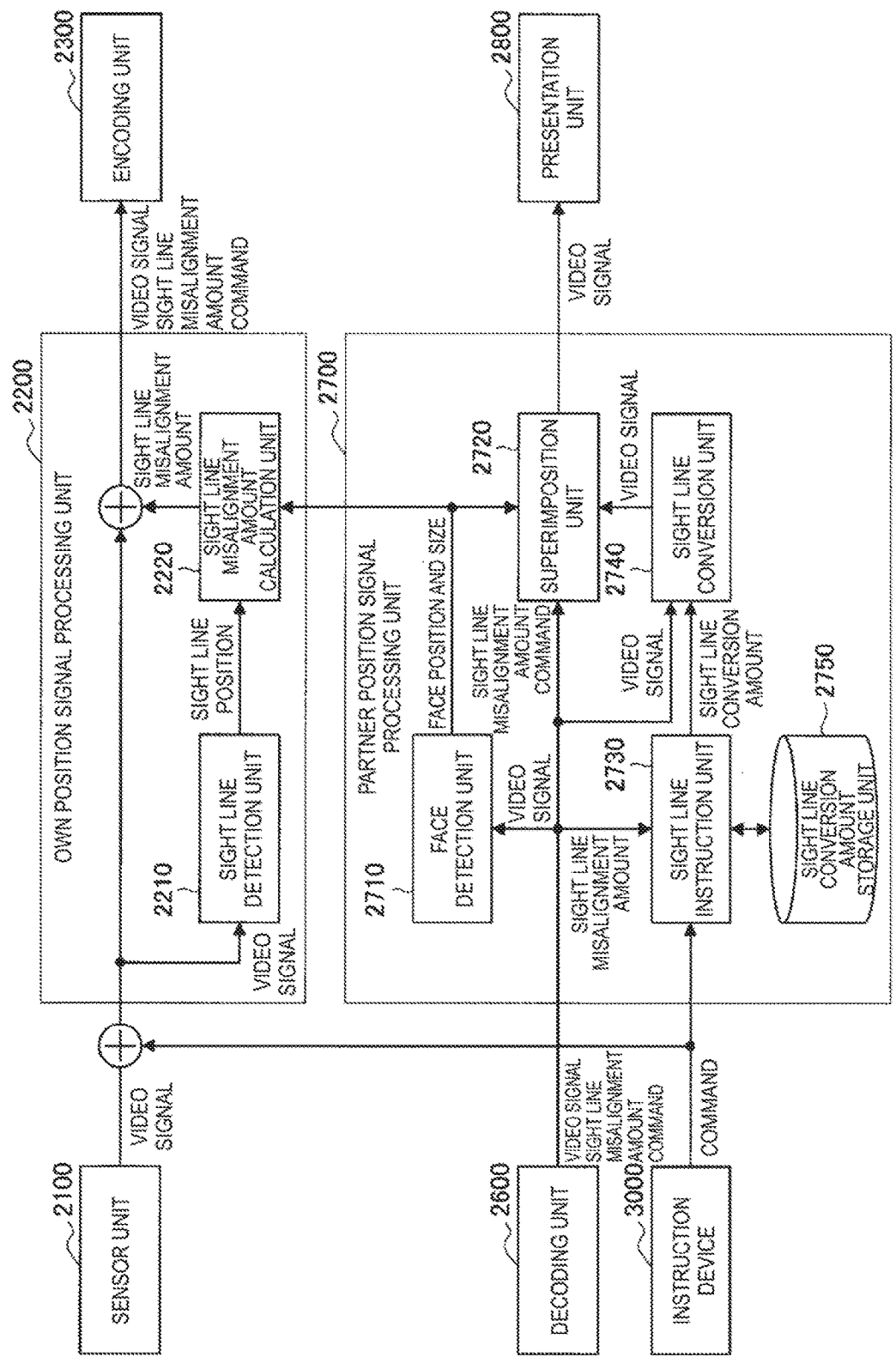
FIG. 37 is a schematic diagram illustrating major components of a terminal according to the fifth embodiment.

FIG. 37 is a schematic diagram illustrating major components of the terminal 2000 according to the fifth embodiment. The basic configuration is the same as FIG. 19, but the sight line misalignment amount is sent to the sight line instruction unit 2730 in the configuration illustrated in FIG. 37. The sight line instruction unit 2730 stores a set of the sight line misalignment amount and the sight line conversion amount in the sight line conversion amount storage unit 2750.

Figure 38:
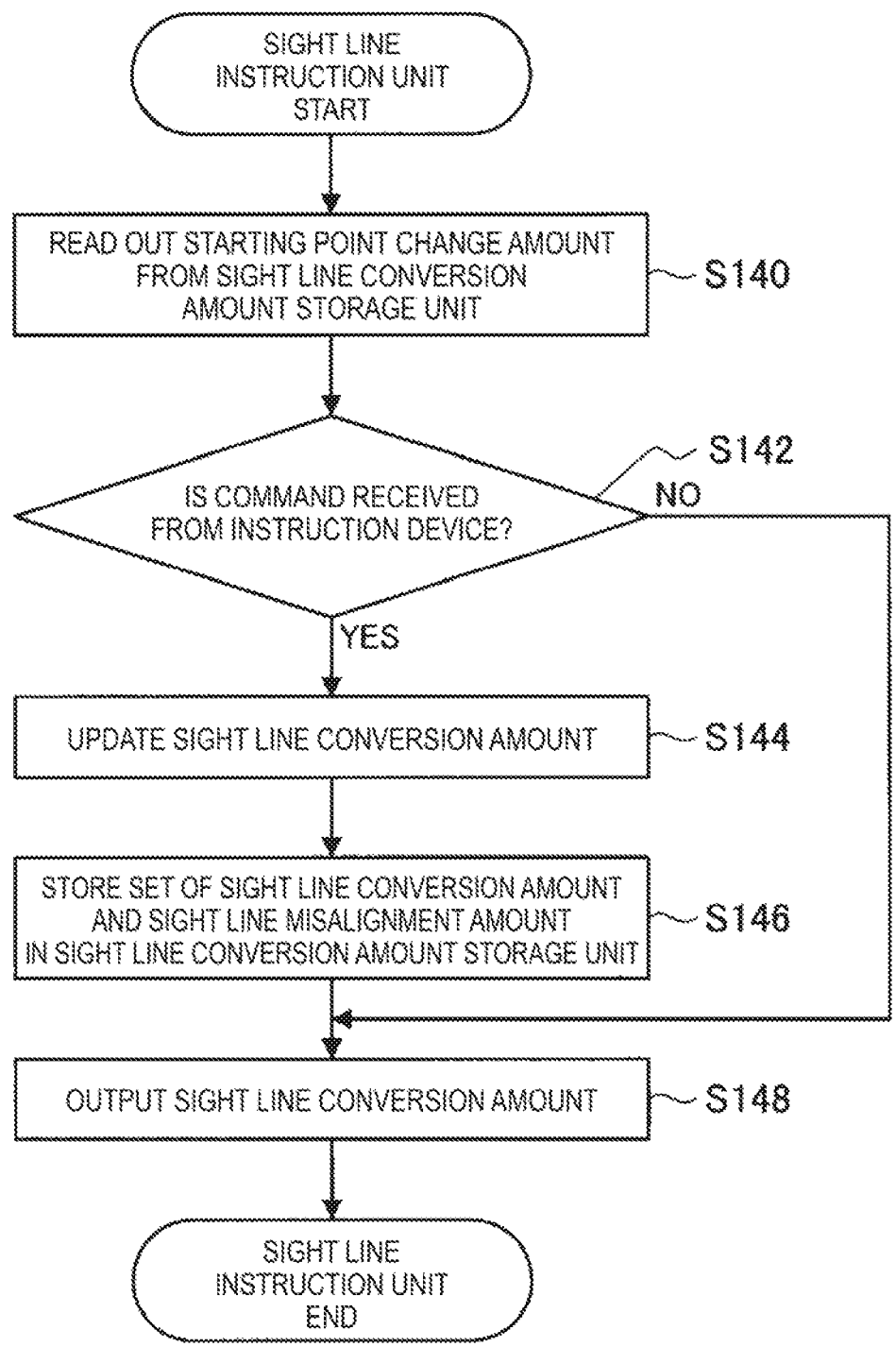
FIG. 38 is a flowchart illustrating a process of a sight line instruction unit.

FIG. 38 is a flowchart illustrating a process of the sight line instruction unit 2730. First, in step S140, the starting point conversion amount is read out from the sight line change amount storage unit 2750. In next step S142, it is determined whether or not a command has been received from the instruction device 3000, and if the command has been received, the process proceeds to step S144, and updates the sight line conversion amount. In next step S146, a set of the sight line conversion amount and the sight line misalignment amount received from the terminal 1000 is stored in the sight line conversion amount storage unit 1750. In next step S148, the sight line conversion amount is output to the sight line conversion unit 1740. The processes of steps S144, S146 are performed for each movement site, when the user A moves the face position to a plurality of sites.

Also, if the command is not received from the instruction device 142 in step S142, the sight line conversion amount stored in the sight line conversion amount storage unit 2750 is output to the sight line change unit 1740.

Figure 39:
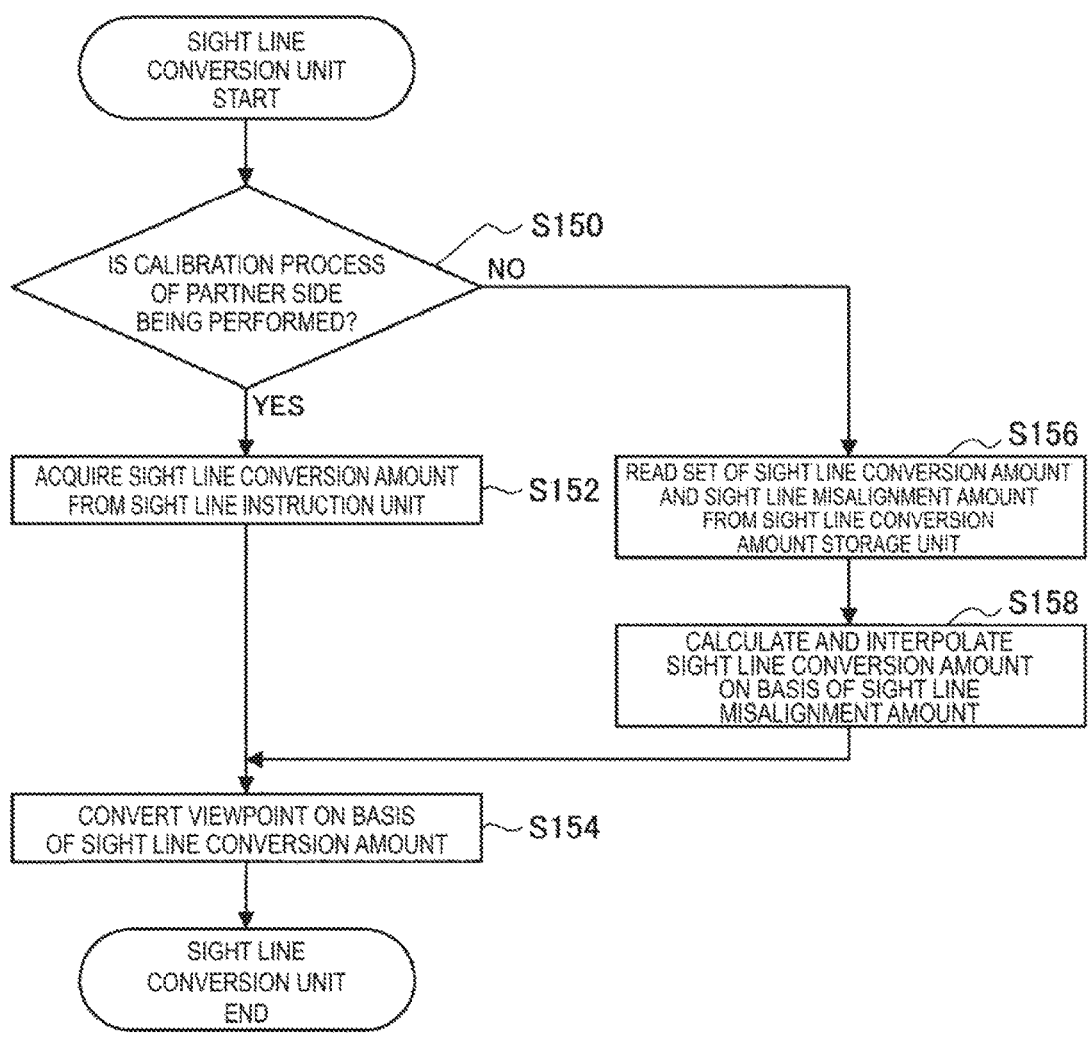
FIG. 39 is a flowchart illustrating a process of a sight line conversion unit.

FIG. 39 is a flowchart illustrating a process of the sight line conversion unit 2740. First, in step S150, it is determined whether or not the calibration process of the partner side is being performed, and if the calibration process of the partner side is being performed, the process proceeds to step S152, and acquires the sight line conversion amount from the sight line instruction unit 152. In next step S154, the sight line is converted on the basis of the sight line conversion amount.

On the other hand, if the calibration process of the partner side is not being performed in step S150, the process proceeds to step S156. In step S156, the set of the sight line change amount and the sight line misalignment amount is read from the sight line conversion amount storage unit 1750. In next step S158, the sight line conversion amount is calculated and interpolated on the basis of the sight line misalignment amount received from the terminal 1000. In next step S154, the sight line is converted on the basis of the calculated and interpolated sight line conversion amount.

In step S158, when [x0, y0] and [x1, y1] are stored as the sets of [sight line misalignment amount, sight line conversion amount], and the sight line misalignment amount is x, the sight line conversion amount y is calculated and interpolated from the stored two sets of values, for example. In this case, the sight line conversion amount y can be calculated from the below equation.

$$y=y0+(y1-y0)*(x-x0)/(x1-x0)$$

As described above, according to the fifth embodiment, the sight line conversion can be performed in consideration of the positional misalignment of the face position, by performing the calibration at a plurality of face positions and storing the sets of the sight line misalignment amount and the sight line conversion amount. Thus, the sight line position can be set with high accuracy, even when the face position is misaligned.

6. Sixth Embodiment

[6.1. Overview of System]

Next, a sixth embodiment of the present disclosure will be described. In the third embodiment, it is assumed that the face position of the user A becomes misaligned positionally over time. If the face position becomes misaligned positionally, the position of the sight line is not aligned. Hence, in the sixth embodiment, it is detected whether the face position of the user A has been changed temporally, and if the face position of the user A is misaligned by a threshold value or more, an instruction of recalibration is issued.

Figure 40:
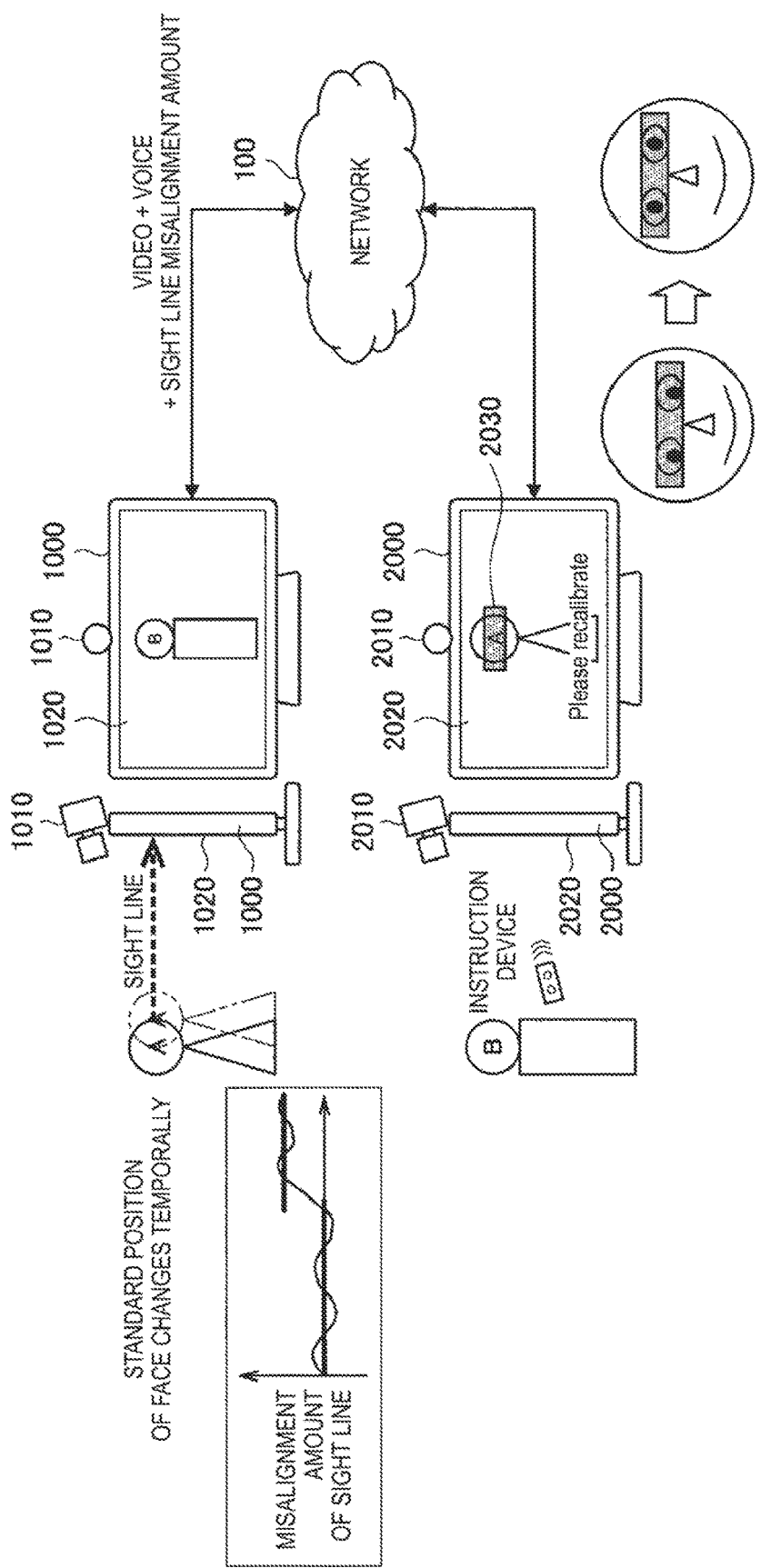
FIG. 40 is a schematic diagram illustrating a system of a sixth embodiment.

FIG. 40 is a schematic diagram illustrating a system of the sixth embodiment. The basic configuration of the system according to the sixth embodiment is the same as the third embodiment. As illustrated in FIG. 40, a change of the sight line misalignment amount of the user A is measured, and when the sight line misalignment amount exceeds a threshold value, a text that prompts the recalibration is displayed on the terminal 2000 of the user B. The terminal 2000 performs the recalibration, and thereby when the sight line misalignment amount exceeds the threshold value, the sight line position of the user A is set to an adequate position.

Figure 41:
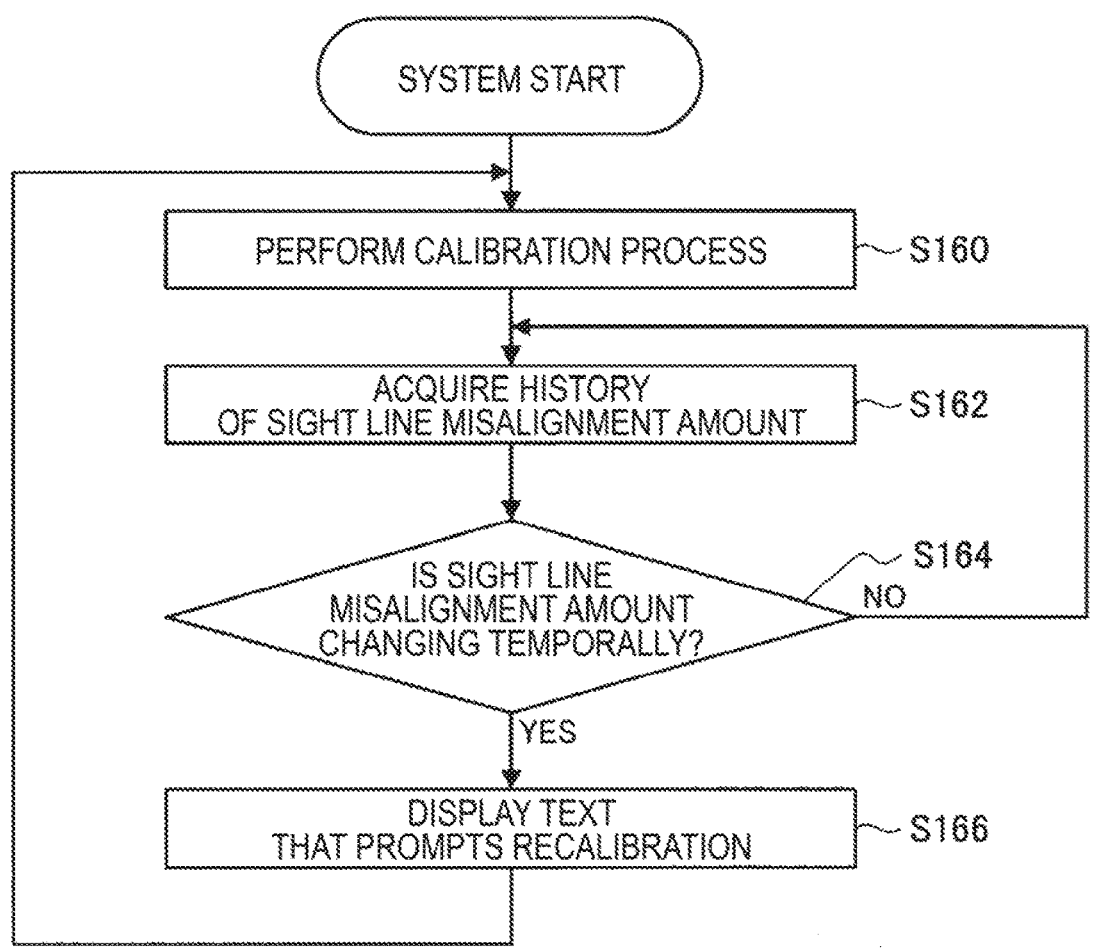
FIG. 41 is a flowchart illustrating a process of the sixth embodiment.

FIG. 41 is a flowchart illustrating a process of the sixth embodiment. First, in step S160, the terminal 2000 performs a calibration process. In next step S162, a history of change of the sight line misalignment amount is acquired. In next step S164, it is determined whether or not the sight line misalignment amount is changing temporally, and if the sight line misalignment amount is changing temporally, the process proceeds to step S166, and displays a text that prompts the recalibration on the terminal 2000. After step S166, the process returns to step S160. In the determination in step S164, it is determined that the sight line misalignment amount is changing temporally, if the sight line misalignment amount exceeds a predetermined threshold value

[6.2. Major Components of Terminal]

Figure 42:
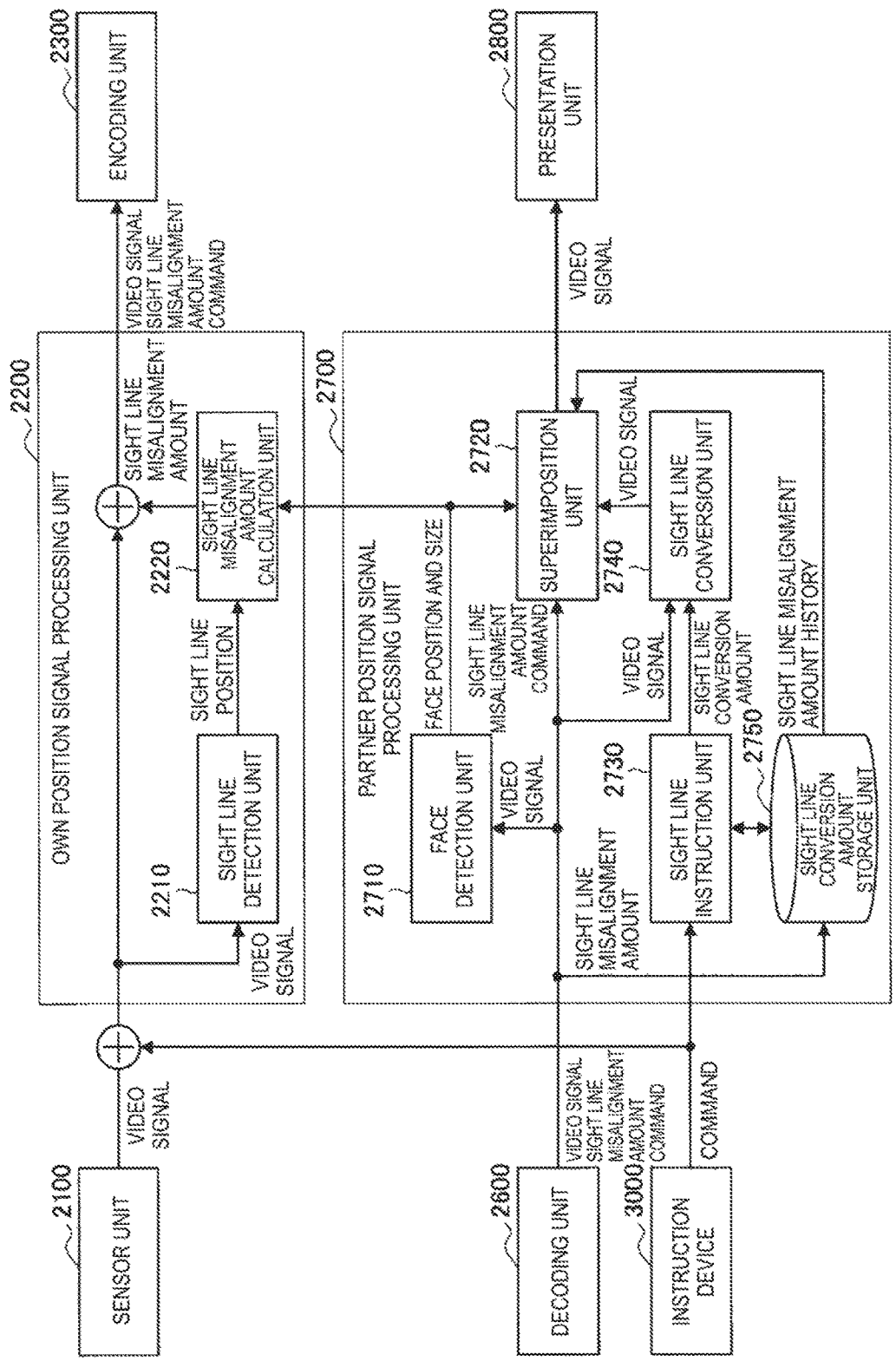
FIG. 42 is a schematic diagram illustrating major components of a terminal according to the sixth embodiment.

FIG. 42 is a schematic diagram illustrating major components of the terminal 2000 according to the sixth embodiment. The basic configuration is the same as FIG. 19, but in the configuration illustrated in FIG. 42, the sight line misalignment amount received from the terminal 1000 is sent to the sight line conversion amount storage unit 2750. Then, the history of the sight line misalignment amount is sent to the superimposition unit 2720 from the sight line conversion amount storage unit 2750. When the sight line misalignment amount exceeds a predetermined threshold value, the superimposition unit 2720 displays the text that prompts the recalibration.

Figure 43:
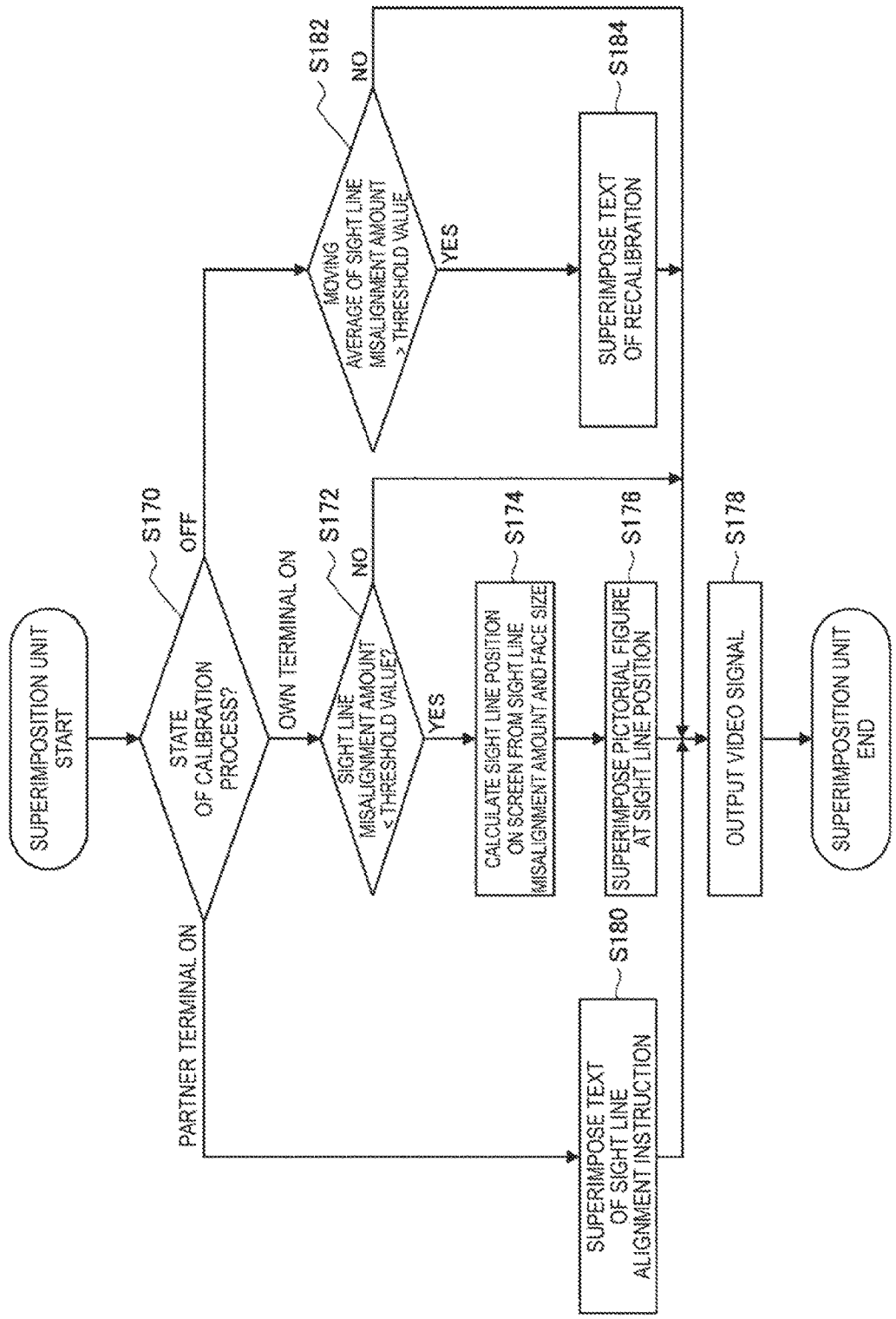
FIG. 43 is a flowchart illustrating a process of a superimposition unit.

FIG. 43 is a flowchart illustrating a process of the superimposition unit 2720. First, the state of the calibration process is determined in step S170. If the calibration of the own terminal is turned on, the process proceeds to step S172, and it is determined whether or not the sight line misalignment amount is smaller than the threshold value, and if the sight line misalignment amount is smaller than the threshold value, the process proceeds to step S174. In step S174, the sight line position on the screen is calculated from the sight line misalignment amount and the face size. In next step S176, the marker 2030 is superimposed at the sight line position. In next step S178, the video signal is output to the presentation unit 2800.

If the calibration of the terminal 1000 of the partner is turned on in step S170, the process proceeds to step S180, and displays a text of sight line alignment instruction "please set sight line on eyes of user A". After step S180, the process proceeds to step S178.

Also, if the calibration is turned off in step S170, the process proceeds to step S182. In step S182, it is determined whether or not the moving average of the sight line misalignment amount exceeds a threshold value, and if the moving average of the sight line misalignment amount exceeds the threshold value, the process proceeds to step S184, and superimposes the text of the recalibration. On the other hand, if the moving average of the sight line misalignment amount does not exceed the threshold value in step S182, the process proceeds to step S178.

As described above, according to the sixth embodiment, when the sight line misalignment amount changes temporally, the text that prompts the recalibration is displayed, and thus the position of the sight line is aligned unfailingly with the partner terminal.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a receiver unit that acquires information relevant to a sight line of a user of a communication partner from a communication partner terminal that performs remote communication;

a face detection unit that detects information relevant to a position and a size of a face of the user of the communication partner, on the basis of a video signal that includes the face of the user of the communication partner and is received from the communication partner terminal; and a superimposition unit that displays and superimposes a sight line position of the user of the communication partner on the video signal that includes the face of the user of the communication partner, on the basis of the information relevant to the sight line of the user of the communication partner and the information relevant to the position and the size of the face of the user of the communication partner.

(2)

The information processing apparatus according to (1), in which the information relevant to the sight line of the communication partner is a sight line misalignment amount of the user of the communication partner relative to a face of a user of the information processing apparatus which is displayed on the communication partner terminal on the basis of a video signal that includes the face of the user of the information processing apparatus.

(3)

The information processing apparatus according to (1), further including:

a video signal acquisition unit that acquires a video signal that includes a face of a user of the information processing apparatus;

a sight line detection unit that acquires information relevant to a sight line of the user of the information processing apparatus from the video signal that includes the face of the user of the information processing apparatus; and a transmitter unit that transmits the video signal that includes the face of the user of the information processing apparatus and the information relevant to the sight line of the user of the information processing apparatus, to the communication partner terminal.

(4)

The information processing apparatus according to (3), further including:

a sight line misalignment amount calculation unit that calculates a sight line misalignment amount of the user of the information processing apparatus relative to the face of the user of the communication partner, on the basis of the information relevant to the sight line of the user of the information processing apparatus and the information relevant to the position and the size of the face of the user of the communication partner, in which the transmitter unit transmits the sight line misalignment amount of the user of the information processing apparatus relative to the face of the user of the communication partner, to the communication partner terminal.

(5)

The information processing apparatus according to (3), in which the information relevant to the sight line of the user of the communication partner is information of the sight line position of the user of the communication partner, and the information processing apparatus further includes a face detection unit that detects information relevant to a position and a size of the face of the user of the information processing apparatus, on the basis of the video signal that includes the face of the user of the information processing apparatus, and a sight line misalignment amount calculation unit that calculates a misalignment amount of the sight line of the user of the communication partner relative to the face of the user of the information processing apparatus, on the basis of the information of the sight line position of the user of the communication partner and the information relevant to the position and the size of the face of the user of the information processing apparatus.

(6)

The information processing apparatus according to any one of (1) to (5), in which the superimposition unit displays and superimposes a marker indicating the sight line position of the user of the communication partner and having a predetermined size, color, shape, transmittance, or brightness, at a position of an eye of the face of the user of the communication partner.

(7)

The information processing apparatus according to (6), in which the superimposition unit displays and superimposes the marker to cover the eye of the face of the user of the communication partner.

(8)

The information processing apparatus according to (6), in which the superimposition unit displays and superimposes the marker at a position between eyebrows of the user of the communication partner.

(9)

The information processing apparatus according to any one of (1) to (8), further including:

a sight line instruction unit that outputs a sight line conversion amount on the basis of a command input by a user of the information processing apparatus to calibrate the sight line position; and a sight line conversion unit that converts a direction of the sight line of the user of the communication partner, in the video signal that includes the face of the user of the communication partner and is received from the communication partner terminal, on the basis of the sight line conversion amount.

(10)

The information processing apparatus according to (9), in which the command is input in a state in which the sight line position of the user of the communication partner is displayed superimposed on an eye of the face of the user of the communication partner.

(11)

The information processing apparatus according to (9), further including:

a sight line conversion amount storage unit that stores the sight line conversion amount output on the basis of the command by the sight line instruction unit.

(12)

The information processing apparatus according to (11), in which the information relevant to the sight line of the communication partner is a sight line misalignment amount of the user of the communication partner relative to a face of the user of the information processing apparatus that is displayed on the communication partner terminal on the basis of a video signal that includes the face of the user of the information processing apparatus, the sight line conversion amount storage unit stores a set of the sight line conversion amount and the sight line misalignment amount corresponding to the sight line conversion amount, the sight line misalignment amount acquired from the communication partner terminal is input in the sight line instruction unit, and the sight line instruction unit outputs the sight line conversion amount corresponding to the input sight line misalignment amount by interpolating the input sight line misalignment amount, on the basis of the set of the sight line conversion amount and the sight line misalignment amount corresponding to the sight line conversion amount.

(13)

The information processing apparatus according to (9), in which in a case where information relevant to the sight line position of the user of the communication partner temporally changes, the superimposition unit displays and superimposes information that prompts recalibration.

(14)

An information processing apparatus including:

a video signal acquisition unit that acquires a video signal that includes a face of a user of the information processing apparatus;

a sight line detection unit that acquires information relevant to a sight line position of the user of the information processing apparatus from the video signal that includes the face of the user of the information processing apparatus;

a face detection unit that detects information relevant to a position and a size of the face of the user of the information processing apparatus, on the basis of the video signal that includes the face of the user of the information processing apparatus; and a superimposition unit that displays and superimposes the sight line position of the user of the information processing apparatus on the video signal that includes the face of the user of the information processing apparatus, on the basis of the information relevant to the sight line position of the user of the information processing apparatus and the information relevant to the position and the size of the face of the user of the information processing apparatus.

(15)

The information processing apparatus according to (14), further including:

a sight line instruction unit that outputs a sight line conversion amount on the basis of a command input by the user of the information processing apparatus to calibrate the sight line position; and a sight line conversion unit that converts a direction of a sight line of the user of the information processing apparatus, in the video signal that includes the face of the user of the information processing apparatus, on the basis of the sight line conversion amount.

(16)

A communication system including:

a first communication apparatus including a receiver unit that acquires information relevant to a sight line position of a user of a second communication apparatus from the second communication apparatus that performs remote communication, a face detection unit that detects information relevant to a position and a size of a face of the user of the second communication apparatus, on the basis of a video signal that includes the face of the user of the second communication apparatus and is received from the second communication apparatus, and a superimposition unit that displays and superimposes the sight line position of the user of the second communication apparatus on the video signal that includes the face of the user of the second communication apparatus, on the basis of the information relevant to the sight line position of the user of the second communication apparatus and the information relevant to the position and the size of the face of the user of the second communication apparatus; and the second communication apparatus including a receiver unit that acquires information relevant to a sight line position of a user of the first communication apparatus from the first communication apparatus that performs remote communication, a face detection unit that detects information relevant to a position and a size of a face of the user of the first communication apparatus, on the basis of a video signal that includes the face of the user of the first communication apparatus and is received from the first communication apparatus, and a superimposition unit that displays and superimposes the sight line position of the user of the first communication apparatus on the video signal that includes the face of the user of the first communication apparatus, on the basis of the information relevant to the sight line position of the user of the first communication apparatus and the information relevant to the position and the size of the face of the user of the first communication apparatus.

(17)

An information processing method including:

acquiring information relevant to a sight line of a user of a communication partner from a communication partner terminal that performs remote communication;

detecting information relevant to a position and a size of a face of the user of the communication partner, on the basis of a video signal that includes the face of the user of the communication partner and is received from the communication partner terminal; and displaying and superimposing a sight line position of the user of the communication partner on the video signal that includes the face of the user of the communication partner, on the basis of the information relevant to the sight line of the user of the communication partner and the information relevant to the position and the size of the face of the user of the communication partner.

(18)

A program for causing a computer to function as:

a means for acquiring information relevant to a sight line of a user of a communication partner from a communication partner terminal that performs remote communication;

a means for detecting information relevant to a position and a size of a face of the user of the communication partner, on the basis of a video signal that includes the face of the user of the communication partner and is received from the communication partner terminal; and a means for displaying and superimposing a sight line position of the user of the communication partner on the video signal that includes the face of the user of the communication partner, on the basis of the information relevant to the sight line of the user of the communication partner and the information relevant to the position and the size of the face of the user of the communication partner.

REFERENCE SIGNS LIST 2100, 4100 sensor unit
2210, 4210 sight line detection unit
2212, 2710, 4250 face detection unit
2220 sight line misalignment amount calculation unit
2400 transmitter unit
2500 receiver unit
2720, 4260 superimposition unit
2730, 4270 sight line instruction unit
2740, 4290 sight line conversion unit
2750 sight line conversion amount storage unit

The invention claimed is:

1. An information processing apparatus, comprising:
a receiver unit configured to acquire, from a communication partner terminal, first information associated with a sight line of a first user of the communication partner terminal, wherein the communication partner terminal remotely communicates with the information processing apparatus;
a first face detection unit configured to detect second information, associated with a position of a face of the first user and a size of the face of the first user, based on a first video signal that includes the face of the first user, wherein the first video signal is received from the communication partner terminal; and
a superimposition unit configured to display and superimpose, based on the first information and the second information, a sight line position of the first user on the first video signal.

2. The information processing apparatus according to claim 1, wherein
the first information is a sight line misalignment amount of the first user relative to a face of a second user of the information processing apparatus displayed in a second video signal, wherein the second video signal is displayed on the communication partner terminal.

3. The information processing apparatus according to claim 1, further comprising:
a video signal acquisition unit configured to acquire a second video signal that includes a face of a second user of the information processing apparatus;
a sight line detection unit configured to acquire a third information associated with a sight line of the second user, wherein the third information is acquired from the second video signal; and
a transmitter unit configured to transmit the second video signal and the third information to the communication partner terminal.

4. The information processing apparatus according to claim 3, further comprising:
a first sight line misalignment amount calculation unit configured to calculate a sight line misalignment amount of the second user relative to the face of the first user in the first video signal, based on the third information and the second information,
wherein the transmitter unit is further configured to transmit the sight line misalignment amount to the communication partner terminal.

5. The information processing apparatus according to claim 3, wherein
the first information is the sight line position of the first user, and
the information processing apparatus further includes
a second face detection unit configured to detect fourth information associated with a position of the face of the second user and a size of the face of the second user based on the second video signal that includes the face of the second user, and a second sight line misalignment amount calculation unit configured to calculate a misalignment amount of the sight line of the first user relative to the face of the second user, based on the first information and the fourth information.

6. The information processing apparatus according to claim 1, wherein the superimposition unit is further configured to display and superimpose a marker that indicates the sight line position of the first user, wherein the marker has at least one of a specific size, color, shape, transmittance, or brightness, and wherein the marker is at a position of an eye of the face of the first user displayed in the communication partner terminal.

7. The information processing apparatus according to claim 6, wherein the superimposition unit is further configured to display and superimpose the marker to cover the eye of the face of the first user displayed in the communication partner terminal.

8. The information processing apparatus according to claim 6, wherein the superimposition unit is further configured to display and superimpose the marker between eyebrows of the first user displayed in the communication partner terminal.

9. The information processing apparatus according to claim 1, further comprising:

a sight line instruction unit configured to output a sight line conversion amount based on user command to calibrate the sight line position; and a sight line conversion unit configured to convert, based on the sight line conversion amount, a direction of the sight line of the first user in the first video signal received from the first communication partner terminal.

10. The information processing apparatus according to claim 9, wherein the user command is based on the sight line position of the first user that is displayed superimposed on an eye of the face of the first user.

11. The information processing apparatus according to claim 9, further comprising a sight line conversion amount storage unit configured to store the sight line conversion amount.

12. The information processing apparatus according to claim 11, wherein the first information is a sight line misalignment amount of the first user relative to the face of the second user displayed on the communication partner terminal, the sight line conversion amount storage unit is further configured to store each of the sight line conversion amount and the sight line misalignment amount, the sight line misalignment amount acquired from the communication partner terminal is input to the sight line instruction unit, and the sight line instruction unit is further configured to output the sight line conversion amount based on interpolation of the input sight line misalignment amount.

13. The information processing apparatus according to claim 9, wherein based on a temporary change in the first information, the superimposition unit is further configured to display and superimpose an instruction, wherein the instruction corresponds to recalibration.

14. An information processing apparatus, comprising:

a video signal acquisition unit configured to acquire a video signal that includes a face of a user of the information processing apparatus;

a sight line detection unit configured to acquire first information associated with a sight line position of the user from the video signal;

a face detection unit configured to detect second information associated with a position of the face and a size of the face of the user, based on the video signal; and a superimposition unit configured to display and superimpose, based on the first information and the second information, the sight line position of the user on the video signal.

15. The information processing apparatus according to claim 14, further comprising:

a sight line instruction unit configured to output a sight line conversion amount based on a user command to calibrate the sight line position; and a sight line conversion unit configured to convert, based on the sight line conversion amount, a direction of a sight line of the user in the video signal.

16. A communication system, comprising:

a first communication apparatus; and a second communication apparatus, wherein the first communication apparatus includes:

a first receiver unit configured to acquire, from the second communication apparatus, first information associated with a first sight line position of a first user of the second communication apparatus, wherein the second communication apparatus remotely communicates with the first communication apparatus;

a first face detection unit configured to detect second information associated with a position of a face of the first user, and a size of the face of the first user based on a first video signal that includes the face of the first user, wherein the first video signal is received from the second communication apparatus; and a first superimposition unit configured to display and superimpose, based on the first information and the second information, the first sight line position of the first user on the first video signal, and wherein the second communication apparatus includes:

a second receiver unit configured to acquire, from the first communication apparatus, third information associated with a second sight line position of a second user of the first communication apparatus, wherein the first communication apparatus remotely communicates with the second communication apparatus;

a second face detection unit configured to detect fourth information associated with a position of a face of a first user, and a size of the face of the second user based on a second video signal that includes the face of the second user, wherein the second video signal is received from the first communication apparatus; and a second superimposition unit configured to display and superimpose, based on the third information and the fourth information, the second sight line position of the second user on the second video signal.

17. An information processing method, comprising:
- acquiring, from a communication partner terminal, first information associated with a sight line of a user of the communication partner terminal, that communicates remotely;
- detecting second information associated with a position of a face and a size of the face of the user
  - wherein the second information is detected based on a video signal that includes the face of the user, and
  - wherein the video signal is received from the communication partner terminal; and
- displaying and superimposing, based on the first information and the second information, a sight line position of the user on the video signal.

18. A non-transitory computer-readable device having stored thereon, computer-executable instructions which, when executed by a processing circuitry, cause the processing circuitry to execute operations, the operations comprising:
- acquiring, from a communication partner terminal, first information associated with a sight line of a user of the communication partner terminal, that communicates remotely;
- detecting second information associated with a position of a face and a size of the face of the user
  - wherein the second information is detected based on a video signal that includes the face of the user, and
  - wherein the video signal is received from the communication partner terminal; and
- displaying and superimposing, based on the first information and the second information, a sight line position of the user on the video signal.

* * * * *